US009761226B2

(12) United States Patent
Michaelangelo et al.

(10) Patent No.: US 9,761,226 B2
(45) Date of Patent: Sep. 12, 2017

(54) SYNCHRONIZED TRANSCRIPTION RULES HANDLING

(71) Applicant: MModal IP LLC, Franklin, TN (US)

(72) Inventors: Nixon Michaelangelo, Bangalore (IN); Dennis Graham, Berryville, VA (US); Doug Smith, Berryville, VA (US); Paula Appley, Walla Walla, WA (US)

(73) Assignee: MModal IP LLC, Franklin, TN (US)

( * ) Notice: Subject to any disclaimer, the term of this patent is extended or adjusted under 35 U.S.C. 154(b) by 0 days.

(21) Appl. No.: 14/310,557

(22) Filed: Jun. 20, 2014

(65) Prior Publication Data

US 2014/0303977 A1      Oct. 9, 2014

Related U.S. Application Data

(63) Continuation of application No. 12/606,823, filed on Oct. 27, 2009, now abandoned.

(60) Provisional application No. 61/108,646, filed on Oct. 27, 2008.

(51) Int. Cl.
| | |
|---|---|
| *G10L 15/26* | (2006.01) |
| *G06F 17/27* | (2006.01) |
| *G10L 15/22* | (2006.01) |
| *G10L 15/06* | (2013.01) |

(52) U.S. Cl.
CPC ............ *G10L 15/26* (2013.01); *G06F 17/273* (2013.01); *G06F 17/274* (2013.01); *G06F 17/2725* (2013.01); *G10L 15/063* (2013.01); *G10L 15/22* (2013.01)

(58) Field of Classification Search
CPC ...... G10L 15/26; G10L 15/183; G10L 15/187

USPC ............... 704/235, 251, 260, 267, 270.1
See application file for complete search history.

(56) References Cited

U.S. PATENT DOCUMENTS

| | | | | |
|---|---|---|---|---|
| 5,148,366 | A | * | 9/1992 | Buchanan et al. ............. 715/234 |
| 6,377,922 | B2 | * | 4/2002 | Brown et al. ................... 704/251 |
| 7,613,610 | B1 | * | 11/2009 | Zimmerman et al. ......... 704/235 |
| 7,869,998 | B1 | * | 1/2011 | Di Fabbrizio et al. ........ 704/251 |
| 7,933,777 | B2 | | 4/2011 | Koll |
| 8,024,196 | B1 | * | 9/2011 | Wodtke et al. ................ 704/277 |
| 8,583,439 | B1 | * | 11/2013 | Kondziela ...................... 704/267 |
| 8,694,309 | B1 | * | 4/2014 | Fisher ..................... G10L 15/19 704/216 |
| 9,015,047 | B1 | * | 4/2015 | Fisher ..................... G10L 15/08 704/251 |
| 9,244,901 | B1 | * | 1/2016 | Murata .................... G06F 17/27 |
| 2002/0077819 | A1 | * | 6/2002 | Girardo ......................... 704/260 |
| 2004/0254816 | A1 | | 12/2004 | Myers |
| 2005/0071194 | A1 | | 3/2005 | Bormann |

(Continued)

*Primary Examiner* — Douglas Godbold
*Assistant Examiner* — Mark Villena
(74) *Attorney, Agent, or Firm* — Blueshift IP, LLC; Robert Plotkin

(57) ABSTRACT

Methods, systems, and software are disclosed for providing rule handling functionality in a distributed transcription environment. Some embodiments provide client-server workflow management for providing and supporting distributed transcription services. Other embodiments provide audio-to-text synchronization to support certain transcription functionality. Still other embodiments provide logging functionality to support quality, personnel, billing, and/or other enterprise tasks. And other embodiments provide functionality to support rule generation, editing, validation, and/or execution.

37 Claims, 17 Drawing Sheets

(56) References Cited

U.S. PATENT DOCUMENTS

| | | |
|---|---|---|
| 2006/0041428 A1 | 2/2006 | Fritsch |
| 2006/0212292 A1* | 9/2006 | Lauvergne et al. ............ 704/235 |
| 2007/0106494 A1* | 5/2007 | Detlef ................... G06F 17/273 |
| | | 704/9 |
| 2007/0203708 A1* | 8/2007 | Polcyn et al. ............. 704/270.1 |
| 2007/0299652 A1 | 12/2007 | Koll |
| 2007/0299665 A1 | 12/2007 | Koll |
| 2008/0091426 A1* | 4/2008 | Rempel ................... G10L 15/26 |
| | | 704/251 |
| 2008/0255837 A1* | 10/2008 | Kahn et al. .................... 704/235 |
| 2009/0055184 A1* | 2/2009 | Hebert ............... G06F 17/2705 |
| | | 704/257 |
| 2009/0113293 A1* | 4/2009 | Schubert ................ G06F 17/24 |
| | | 715/256 |

\* cited by examiner

SYNCHRONIZED TRANSCRIPTION RULES HANDLING

BACKGROUND

Embodiments of the invention are related to transcription services and, in particular, to systems and methods for rules handling with respect to distributed transcription services.

In certain industries, transcription services may be provided to support the recording and flow of information between multiple parties and/or formats. For example, in the medical industry, doctors may gather information from a patient and dictate the information into an audio file. Transcriptionists may then transcribe the dictated information into it textual format for charting, compliance, and/or other record-keeping uses.

In some cases, transcription services are provided within a distributed transcription environment, in which transcription functions are distributed among multiple entities in multiple locations. With a distributed workforce, it may be desirable to implement workflow management, rule handling, quality control, and other support functions. These support functions may help to maximize accuracy and efficiency of transcription services.

SUMMARY

Among other things, embodiments of the invention provide methods and systems for handling rules in a distributed transcription environment. Some embodiments of the invention receive dictation information from multiple users (e.g., from various doctors). A workflow management system uses the dictation information and other information to generate a transcription assignment, which it assigns to one or more of a group of transcriptionists. The transcriptionists interact with a transcription interface to transcribe the dictation information into a transcription product. The interface may provide various functionality, including audio-to-transcription synchronization and rule handling. The transcription product may be validated (e.g., by auditors or editors) and otherwise finalized into a final transcription product for delivery to a customer. Certain embodiments provide rule building functionality, including systems and methods for rule creation, editing, validation, publishing, etc. Other embodiments provide logging and evaluating functionality, including statistical processing of logged job information to evaluate quality metrics.

According to one set of embodiment, a method is provided for rules handling in a distributed transcription system. The method includes receiving a transcription assignment at a computer-implemented transcription environment, the transcription assignment including: dictation data comprising audio information dictated by an author into a dictation interface, the author being associated with a context designation; and a transcription rule set being one of a number of transcription rule sets stored in a rules data store and generated for application to the dictation data as a function of the context designation. The method further includes receiving transcription data at the computer-implemented transcription environment from a transcriptionist via a transcription interface, the transcription data including textual representations of corresponding portions of the dictation data, the textual representations being at least partially synchronized with the corresponding portions of the dictation data; identifying a rule violation by applying the transcription rule set to the transcription data using the computer-implemented transcription environment, the rule violation being associated with a textual representation and substantially synchronized with the corresponding portion of the dictation data; and displaying an indication of the rule violation to the transcriptionist via the computer-implemented transcription environment.

According to another set of embodiments, a system is provided for rules handling in a distributed transcription system. The system includes a transcription module and a validation module. The transcription module is configured to: receive a transcription assignment, the transcription assignment having: dictation data comprising audio information dictated by an author into a dictation interface, the author being associated with a context designation: and a transcription rule set being one of a number of transcription rule sets stored in a rules data store and generated for application to the dictation data as a function of the context designation; receive transcription data via a computer-implemented transcription environment from a transcriptionist via a transcription interface, the transcription data including textual representations of corresponding portions of the dictation data, the textual representations being at least partially synchronized with the corresponding portions of the dictation data; and generate a draft transcription product including the transcription data. The validation module is communicatively coupled with the transcription module, and configured to validate the draft transcription product to generate a validated transcription product by: identifying rule violations by applying the transcription rule set to the transcription data, each rule violation being associated with a textual representation and substantially synchronized with the corresponding portion of the dictation data; and resolving each rule violation.

According to a third set of embodiments, a machine-readable medium is provided for rules handling in a transcription environment, the machine-readable medium having instructions stored thereon which, when executed by a machine, cause the machine to perform steps. The steps include: receiving a transcription assignment at a computer-implemented transcription environment, the transcription assignment including: dictation data comprising audio information dictated by an author into a dictation interface, the author being associated with a context designation: and a transcription rule set being one of a number of transcription rule sets stored in a rules data store and generated for application to the dictation data as a function of the context designation; receiving transcription data at the computer-implemented transcription environment from a transcriptionist via a transcription interface, the transcription data having textual representations of corresponding portions of the dictation data, the textual representations being at least partially synchronized with the corresponding portions of the dictation data; and identifying a rule violation by applying the transcription rule set to the transcription data using the computer-implemented transcription environment, the rule violation being associated with a textual representation and substantially synchronized with the corresponding portion of the dictation data.

BRIEF DESCRIPTION OF THE DRAWINGS

A further understanding of the nature and advantages of the present invention may be realized by reference to the figures, which are described in the remaining portion of the specification. In the figures, like reference numerals are used throughout several figures to refer to similar components. In some instances, a reference numeral may have an associated sub-label consisting of a lower-case letter, or a dash followed by a numeral, to denote one of multiple similar components. When reference is made to a reference numeral without specification of a sub-label, the reference is intended to refer to all such multiple similar components.

FIG. 9A shows an illustrative screen shot of an existing rules tab in an embodiment of the rule generation wizard.

FIG. 9B shows an illustrative screen shot of a rule editor tab in an embodiment of the rule generation wizard.

FIG. 10G shows another illustrative screen shot of the rule builder application, in which a function searches a particular section of the document for identified information.

FIG. 12 shows an illustrative screen shot of the rule editor tab in an embodiment of the rule generation wizard, in which grouping is used in a rule.

FIG. 13 shows an embodiment of a "Test" window in an embodiment of the rule generation wizard.

FIG. 15A shows an illustrative screenshot of a transcription environment in which a rule violation is identified, according to various embodiments.

FIG. 15B shows another illustrative screenshot of a transcription environment, in which an auditor can see what rule violations have been identified and what remedial action has occurred, according to various embodiments.

DETAILED DESCRIPTION

In the following description, for the purposes of explanation, numerous specific details are set forth in order to provide a thorough understanding of embodiments of the invention. It will be apparent, however, to one killed in the art that embodiments may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features. Further, while various embodiments are described with reference to medical transcription environments, embodiments may be implemented with any type of transcription environment.

Figure 1:
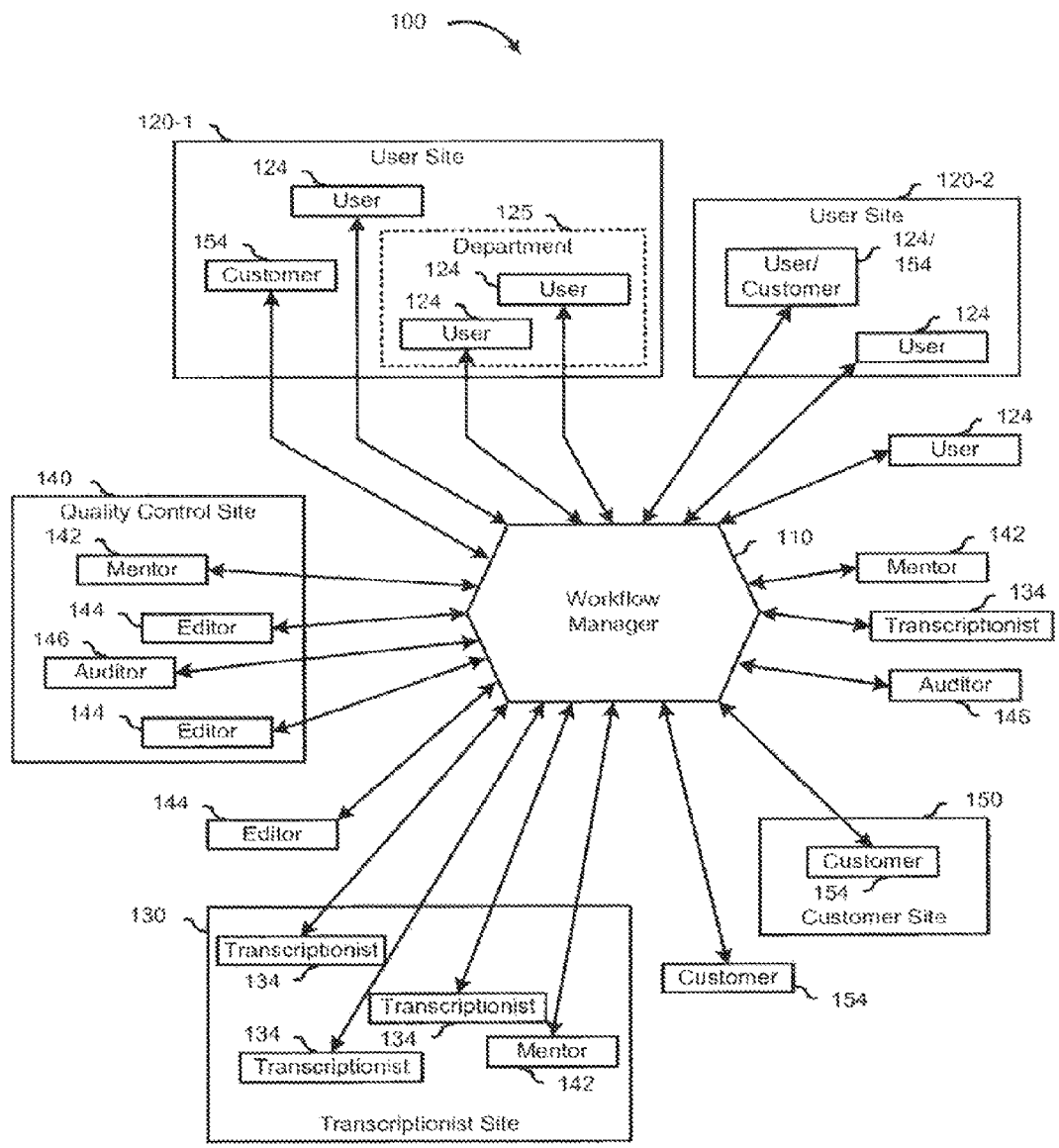
FIG. 1 shows a simplified illustration of an embodiment of a distributed transcription environment, according to various embodiments of the invention.

FIG. 1 shows a simplified illustration of an embodiment of a distributed transcription environment, according to various embodiments of the invention. It will be appreciated that many types of transcription environment 100 are possible with many types, numbers, and/or locations of participants. As such, the transcription environment 100 illustrated in FIG. 1 shows only one embodiment and should not be construed as limiting the scope of the invention.

The transcription environment 100 includes users 124 (e.g., those participants who provide dictation data); transcriptionists 134 (e.g., those participants who transcribe the dictation data into a transcription product), mentors 142, editors 144, and auditors 146 (e.g., those participants who validate the transcription product); and customers 154 (e.g., those participants intended to receive the final transcription product). The transcription environment 100 further includes a workflow manager 110 that manages the flow of transcription services among the multiple participants in their respective distributed locations. Embodiments of the workflow manager 110 may be centralized or distributed, as described more fully below.

In one embodiment, multiple users 124 of a transcription service provided within the transcription environment 100 generate and/or provide dictation information from their respective locations to the workflow manager 110. For example, multiple doctors (i.e., users 124) may dictate information from a patient visit into a Dictaphone, over a telephone, or into an audio file by some other interface.

The interface may be located at any useful location, including at a fixed user site 120 (e.g., a doctor's hospital, clinic, house, etc.) or at a mobile location (e.g., a doctor's cell phone, laptop, etc.). For example, a first user site 120-1 is a hospital with multiple doctors working in multiple locations throughout the user site 120-1. Two user 124 are providing dictation information from within a particular department 125.

It will be appreciated that the location associated with a user 124 may not be the user's physical location at the time the user provides dictation information. For example, a user 124 may be registered with the transcription environment 100 as a physician's assistant working for County General hospital in the Intensive Care Unit. It may be desirable to implement certain types of functionality (e.g., workflow management, rule handling, compliance, etc.) differently, depending at least in part on the location data associated with the user 124. For example, the Intensive Care Unit at County General may have certain types of procedures for charting patients, transferring information, etc. that should be applied to the dictation information coming from the user 124. Notably, it may be desirable to associate the location information to the dictation information even when the user 124 is not physically in that location (e.g., the user 124 is dictating charts at home after leaving the hospital).

In some embodiments, the workflow manager 110 receives the dictation information and/or other information, and generates a transcription assignment. The transcription assignment may then be assigned to one or more transcriptionists 134. Like the users 124 and other participants of the transcription environment 100, the transcriptionists 134 may be physically located at or associated with any useful locations, including distributed locations. For example, as illustrated, the workflow manager 110 may assign transcription assignments to a transcriptionist site 130 (e.g., an office) in India, where there are three transcriptionists 134 and a mentor 142 to oversee the work of the transcriptionists 134.

In some embodiments, the transcriptionists 134 transcribe the dictation information to create a transcription product. In certain embodiments, creation of the transcription product includes playback of the dictation information, synchronization of the dictation information with the transcription, rule handling, etc. Some or all of the transcription functionality may be provided by a dedicated transcription interface.

Embodiments of the transcription environment 100 provide functionality for validating the transcription product. In some embodiments, the validation includes rule building and other rule handling functionality. In one embodiment, a rule builder application allows rules to be created, and a rule engine allows those rules to be used by some or all of the participants of the transcription environment 100. For example, during transcription or after submission of a draft transcription product, the transcription product may be evaluated against a set of rules to find different types of errors. Rule-related functionality is explained in more detail below.

In other embodiments, validation of the transcription product includes validation by one or more participants, other than the transcriptionist 134. For example, mentors 142 may provide coaching, mentoring, management, shadowing, quality feedback, and/or other support for transcriptionists 134. Further, editors 144 may review transcription products and/or other reports, research and/or send alerts, make corrections to transcription products, submit transcriptions to customers, and/or provide other quality functions.

Even further, auditors 146 may perform detailed audits of audio-to-text transcriptions, audit some or all of the various drafts of a transcription product, score and/or document quality information and feedback, track error statistics, develop quality remedies, etc. In certain embodiments, mentors 142 and editors 144 provide pre-delivery quality functions, while auditors 146 provide post-delivery quality functions.

Once a final transcription product has been created (e.g., the product has been validated and prepared for release), it may be delivered to a customer 154. This delivery may be handled by the workflow manager 110. In some cases, a single participant may be a user/customer 124/154. For example, a doctor may dictate patient information and also be the intended recipient of the transcription product for use in the doctor's charts.

Further, in some embodiments, the workflow manager 110 may provide additional functionality. For example, the work flow manager 110 may log information about the assignment and/or the delivered transcription product. This logged information may then be used in many ways, including to track trends, generate quality statistics, supplement billing information, or suggest services or upgrades to participants. In some embodiments, transcription assignments may be assigned partially as a function of the logged data. For example, transcriptionists may be evaluated based on logged data and may receive assignments partly according to the results of those evaluations.

Figure 2:
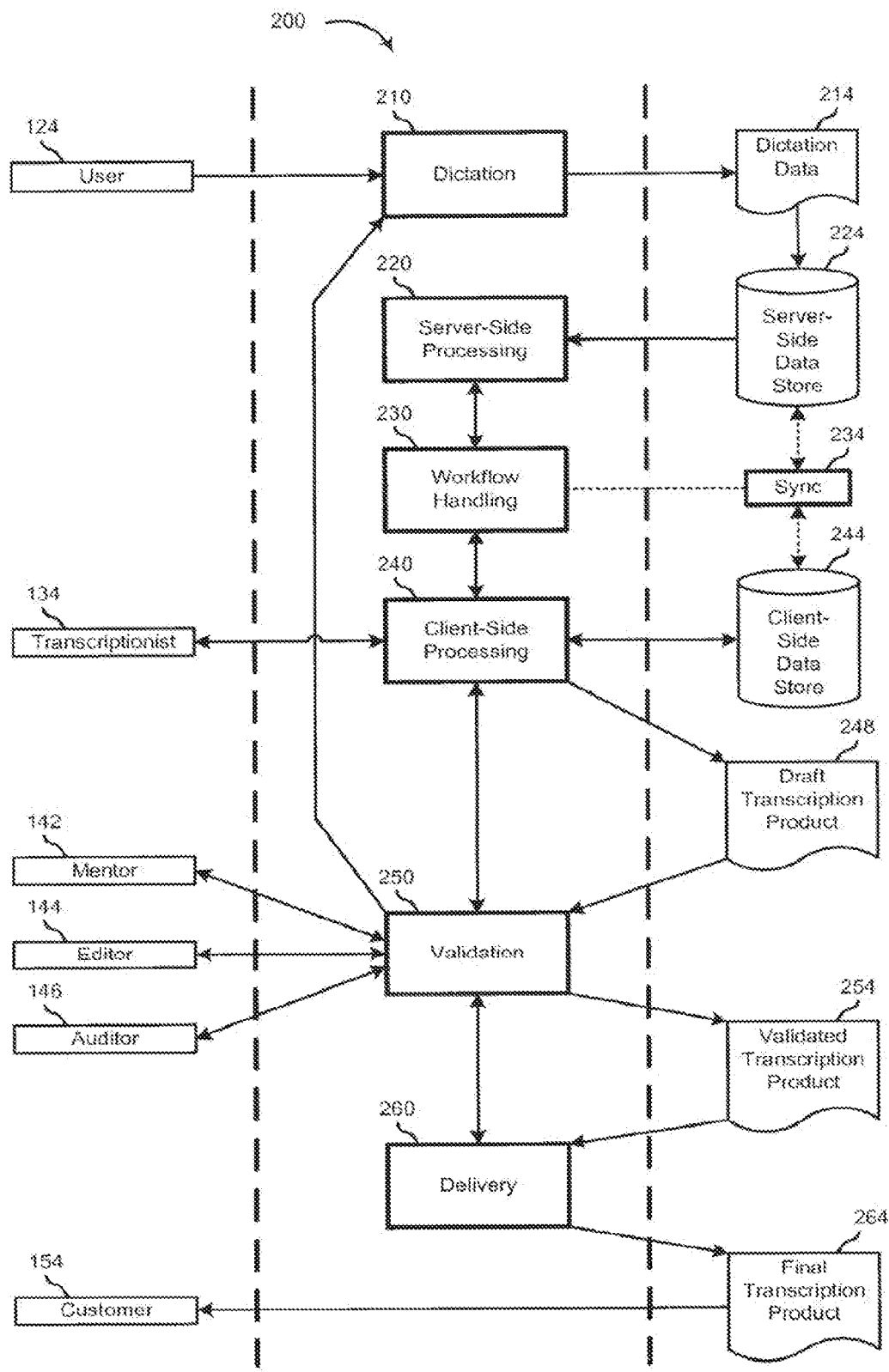
FIG. 2 shows a simplified block diagram of an embodiment of distributed transcription environment, according to various embodiments of the invention.

It may be useful to consider certain functionality of the workflow manager 110 and other parts of the transcription environment 100 as functional blocks. FIG. 2 shows a simplified block diagram of an embodiment of a distributed transcription environment, according to various embodiments of the invention. Embodiments of the transcription environment 200 of FIG. 2 may provide the same or different functionality as the transcription environment 100 of FIG. 1.

Certain functional blocks in the transcription environment 200 may be associated with particular participants and/or data. For example, the transcription environment 200 may provide a dictation block 210. The dictation block 210 receives information from a user 124 and generates dictation data 214. In some embodiments, the dictation block 210 includes one or more dictation interfaces for providing functionality, such as receiving audio (e.g., through a transducer), interacting with the user 124 (e.g., by providing prompts, etc.), processing audio (e.g., encoding into a digital or other format, compression, noise reduction, etc.), and generating metadata (e.g., time/date stamping, processing macro prompts, etc.). The dictation data 214 may include any representation of the user 124 dictation, including a digital or analog audio file.

The dictation data 214 may be stored in a server-side data store 224. The server-side data store 224 may include one or more files, databases, servers, etc., which may be collocated or distributed. The server-side data store 224 may store any data required or desired by the transcription environment 200 in providing transcription or related services. For example, the server-side data store 224 may include a rules server for storing rules data, a document repository server for storing versions of documents (e.g., templates, forms, transcription products, supporting documentation, etc.), a log server for storing log data, and a workflow server for storing workflow data (e.g., employees, participants, workloads, skill sets, schedules, etc.).

In some embodiments, data in the server-side data store 224 is processed by a server-side processing block 220. For example, the server-side processing block 220 may be adapted to use various data to generate transcription assignments. The transcription assignments may be sent to a workflow handling block 230 for assignment to a transcriptionist 134.

In some embodiments, the transcriptionist 134 accesses the transcription assignments assigned to the transcriptionist 134 through functionality of a client-side processing block 240. Data relating to the transcription assignment may be stored in a client-side data store 244. In certain embodiments, a synchronization block 234 maintains a level of synchronicity between the server-side data store 224 and the client-side data store 2441. For example, when the transcriptionist 134 accepts a transcription assignment, only information relating to the transcription assignment (e.g., dictation data 214 and specific workflow data, rules data, etc.) is downloaded to the client-side data store 244. The synchronization block 234 may periodically or constantly check for, and possibly rectify, discrepancies between the server-side data store 224 and the client-side data store 244.

Embodiments of the client-side processing block 240 additionally provide transcription interface functionality for the transcriptionist 134. The transcriptionist may use the interface functionality to generate a draft transcription product 248 from the dictation data 214 and/or other data. In some embodiments, the transcription interface pre-validates the draft transcription product 248. For example, the transcription interface may provide spell checking, grammar checking, and/or pre-validation of certain data within the document (e.g., based on templates, formatting, rules, etc.).

In other embodiments, the pre-validation and/or other validation functionality is provided by a validation block 250. Some or all of the functionality of the validation block 250 may be accessible by the transcriptionist 134 (e.g., may be accessed through the transcription interface), by quality control participants (e.g., mentors 142, editors 144, or auditors 146), or automatically (e.g., by the client-side processing block 240 whenever a draft transcription product 248 is submitted). The validation block 250 may generate a validated transcription product 254.

In some embodiments, additional functionality is provided by a delivery block 260. The delivery block 260 may receive the validated transcription product 254 and generate a final transcription product 264 for delivery to a customer 154. For example, the customer 154 may have certain delivery preferences (e.g., report formatting, paper type, electronic file type, addressing, etc.). The delivery block 260 may receive an electronic file of a final transcription product 264, print it in a format adapted for the files of the customer 154, and generate a mailing label with the mailing information of the customer 154.

It will be appreciated that many types of functionality, participants, and/or data are possible according to the invention. Further, it will be appreciated that the functionality of the transcription environment 100 of FIG. 1 and the transcription environment 200 of FIG. 2 may be implemented in a number of ways. For example, FIGS. 3 and 4 illustrate embodiments of systems for providing server-side and client-side functions of a distributed transcription environment, respectively.

Figure 3:
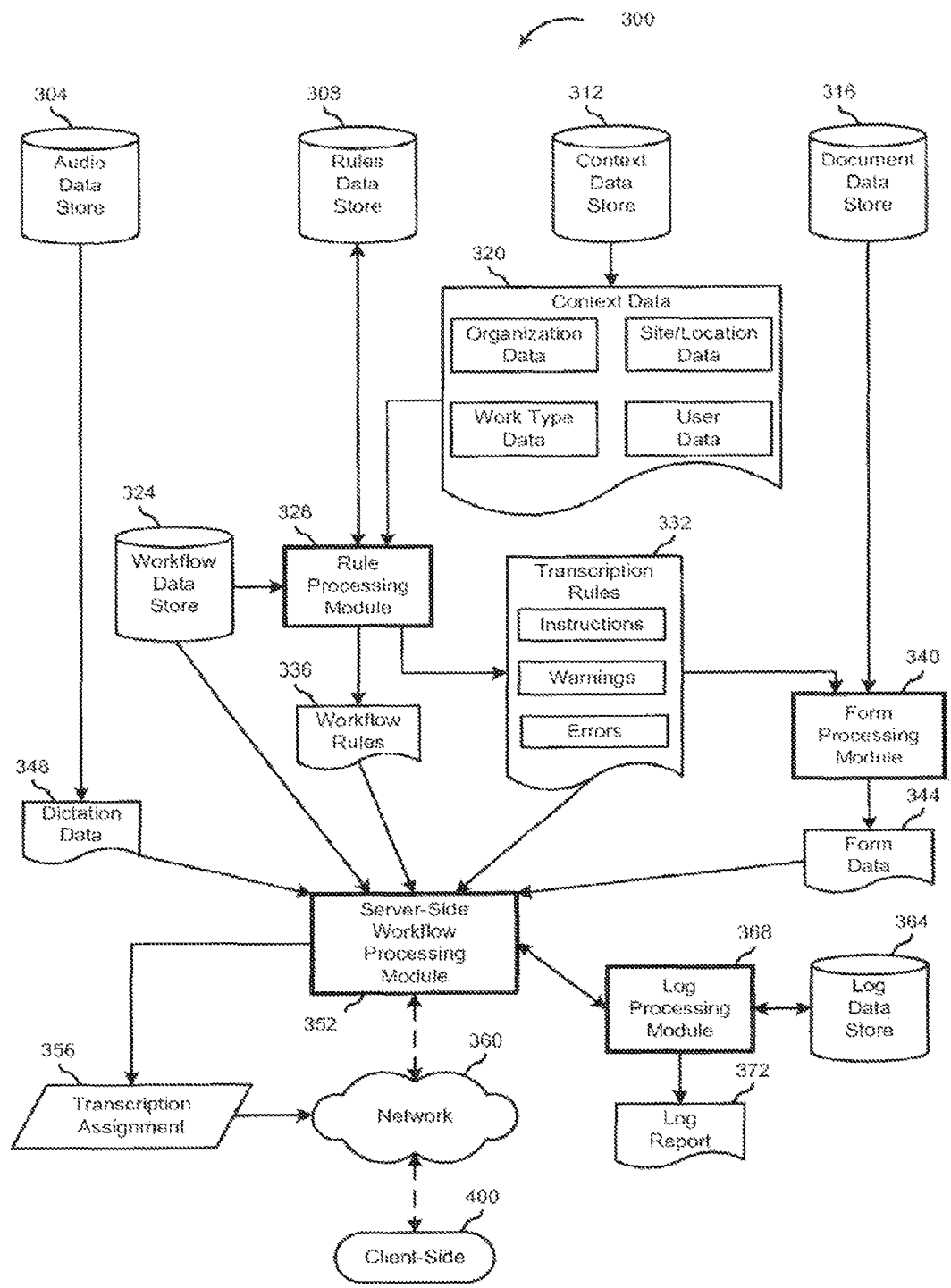
FIG. 3 shows a simplified block diagram of an embodiment of a server-side of a distributed transcription system, according to various embodiments of the invention.
Figure 4:
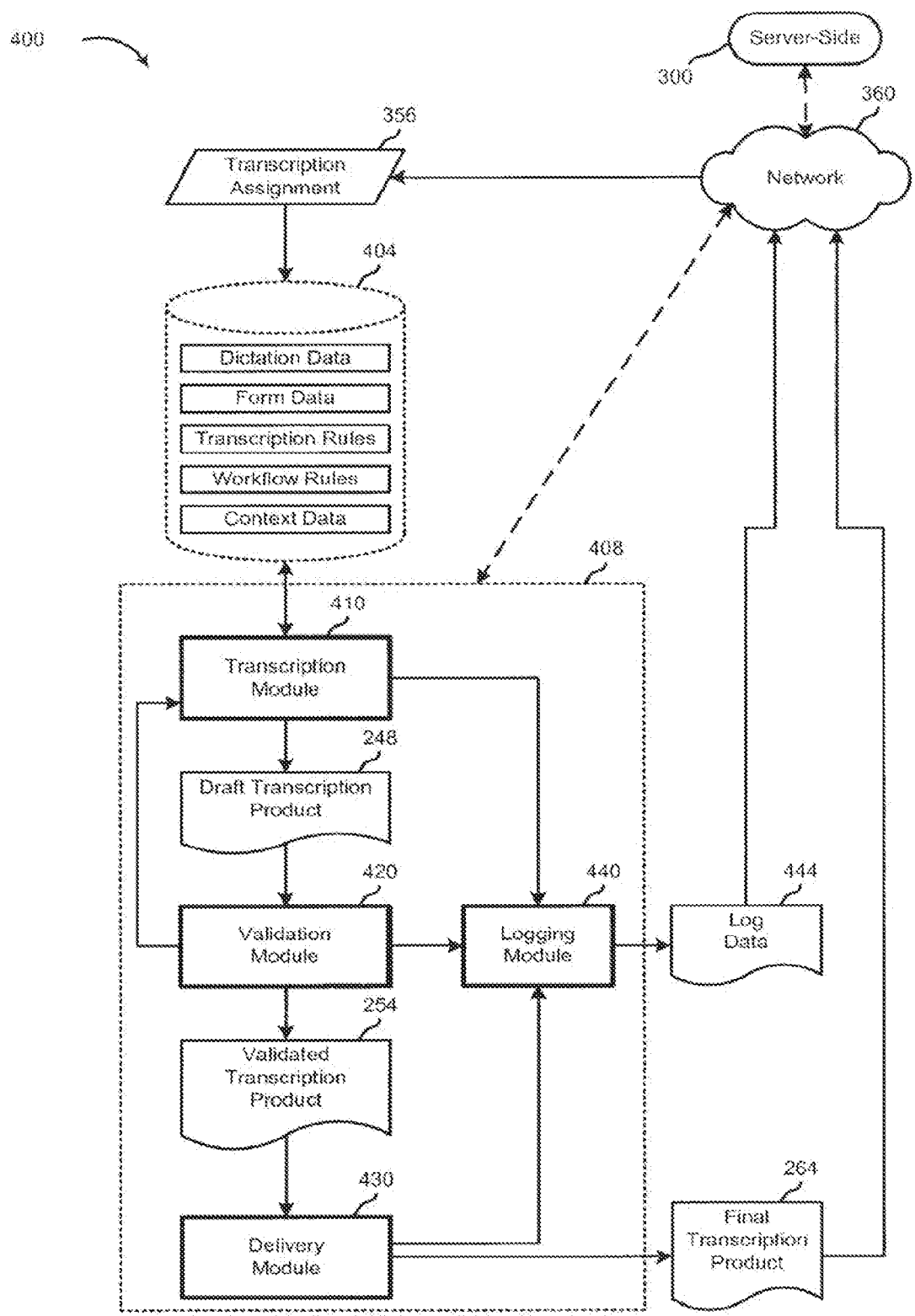
FIG. 4 shows a simplified block diagram of an embodiment of a client-side of a distributed transcription system, like the one shown in FIG. 3, according to various embodiments of the invention.

FIG. 3 shows a simplified block diagram of an embodiment of a server-side of a distributed transcription system, according to various embodiments of the invention. Embodiments of the server-side of the distributed transcription system 300 include an audio data store 304, a rules data store 308, a context data store 312, a document data store 316, a workflow data store 324, and a log data store 364.

Each of these data stores may be implemented in any useful way, for example, in one or more files, in one or more servers, etc. The server-side of the distributed transcription system 300 further includes a number of modules that receive data from multiple data stores and/or other modules, and uses the data to generate server-level information for providing and managing transcription services.

In some embodiments, the audio data store 304 is adapted to store audio files representing dictation data 348. The dictation data 34 may be the same as or different from the dictation data 214 of FIG. 2. For example, the dictation data 348 may or may not be specially formatted or encoded (e.g., compressed, encrypted, transcoded, etc.), and may or may not include related metadata.

The rules data store 308 may be adapted to store rule-related information. The rule-related information may include, for example, existing rules (e.g., rule conditions or expressions), information for use in creating or editing rules (e.g., available expressions, operands, operators, etc.), information on rule hierarchies (e.g., which rules apply to or may be edited by which participants), etc.

The context data store 312 may be adapted to store context data 320 relating to contexts for applying rules, managing workflow, and providing other functions of the server-side of the distributed transcription system 300. In some embodiments, the context data 320 includes data relating to various organizations (e.g., quality control centers, hospitals, clinics, offices, places of business, etc.), sites (e.g., countries, office sites within larger organizations, etc.), departments (e.g., intensive care unit, radiology, pediatrics, etc.), work types (e.g., emergency room admission, routine physical, insurance physical, follow-up visit, etc.), user types (e.g., physicians, physicians' assistants, techs, etc.), specific users (e.g., a specific physician, a specific medical transcriptionist, etc.).

In certain embodiments, the context data 320 is associated with certain permissions and/or hierarchies. Certain rules, forms, assignments, etc. may only be available to or accessible in certain contextual environments. In one example, transcription assignments being sent to India may be associated with certain rules, like specific word usages, compliance requirements, etc. In another example, a physician may have certain preferred ways of dictating charts or a transcriptionist may tend to make certain specific errors (e.g., as determined by predefined arrangements with the physician or transcriptionist, learned from analyzing patterns of use, etc.).

Embodiments of the workflow data store 324 are adapted to store different types of workflow data for use in handling the flow of information throughout the transcription environment. In some embodiments, the workflow data includes personnel information (e.g., personnel schedules, hourly rates, skill sets, etc.), load balancing information (e.g., workloads per personnel, predicted assignment time, due dates, etc.), and/or any other information useful for managing workloads.

One module included in embodiments of the server-side of the distributed transcription system 300 is a rule processing module 328. In some embodiments, the rule processing module 328 provides functionality for generating workflow rules 336. Workflow information may be received from the workflow data store 324 and used by the rule processing module 328 to generate workflow rules 336 for supporting workflow management functions. In other embodiments, the rule processing module 328 receives the rule-related information from the rules data store 308 and the context data 320 from the context data store 312, and generates transcription rules 332. In still other embodiments, the rule processing module 328 provides functionality for creating and/or editing rules, including workflow rules 336 and transcription rules 332.

In some embodiments, the transcription rules 332 include information rules, warning rules, and error rules. Information rules may typically include triggers based on certain transcription assignment attributes that generate informational prompts to a transcriptionist, editor, or other participant. For example, the transcriptionist may be prompted during transcription with the following: "Ensure correct date format has been used in reports—date expanded in full within the document." Warning rules may typically include triggers based on conditions found within a scanned transcription product that indicate a possible error. For example, after submitting a draft transcription product including the word "perineal," the transcriptionist may be prompted with the following: "Possible incorrect word usage . . . double check choice of perineal versus peroneal versus perennial." Error rules may typically include triggers based on conditions found within a scanned transcription product that indicate a definite error. For example, after attempting to submit a transcription product including an electroencephalogram ("EEG") without including a required carbon copy to the EEG lab, the transcriptionist may be prompted with the following: "Requird CC—worktype EEG requires a CC to be sent to the EEG lab."

In certain embodiments, informational rules are provided only to transcriptionists by way of an informational panel within a transcription interface. In other embodiments, warning and error rules are triggered when a transcription product as run through a rules engine. The transcription product may be run through a rules engine manually (e.g., during transcription, editing, auditing, etc.) or automatically (e.g., whenever a draft transcription product is submitted by a transcriptionist). In still other embodiments, triggering of certain types of rules may block submission of a transcription product. For example, an error rule may be set to block submission of a transcription product until the error has been resolved.

In some embodiments, the transcription rules 332 generated by the rule processing module 328 are used by a form processing module 340. The form processing module 340 may also use certain document data from the document data store 316. Embodiments of the document data store 316 store various types and drafts of documents. Some embodiments store various drafts of transcription products, forms, templates, supporting documentation, and/or other documents. In certain embodiments, the document data store 316 includes document management functionality (e.g., storing or tracking document revisions, checking in or checking out documents, searching for documents, creating new documents, etc.). By combining certain document data and transcription rules 332, the form processing module 340 may generate form data 344. The form data 344 may include information useful for providing a transcription assignment to a transcriptionist, like template information, informational rule panels, pre-filled fields, text entry sections, etc.

In some embodiments, the form data 344, transcription rules 332, workflow rules 336, other data from the workflow data store 324, and/or any other useful data is passed to a server-side workflow processing module 352. The server-side workflow processing module 352 may also receive dictation data 348 from the audio data store. This and/or other data may be used by the server-side workflow processing module 352 to generate a transcription assignment 356 and to make workflow determinations (e.g., determine how to assign the transcription assignment 356 and what information to transmit in support of the transcription assignment 356).

In some embodiments, the server-side of the distributed transcription system 300 further includes a log processing module 368 for receiving log data and/or generating log reports 372. In certain embodiments, the log data is stored in and received from the log data store 364. Data may be logged from multiple parts of the transcription environment, including the server-side of the distributed transcription system 300 and one or more client-sides of the distributed transcription system 400. For example, logged data may include workflow logs (e.g., what assignments have been assigned and to whom, actual versus predicted completion times for assignments, etc.), error logs (e.g., what rules were triggered during the transcription process, what errors were identified during other quality control processes, whether the rules were resolved, at what level the rules were resolved, etc.), etc.

After receiving log data, embodiments of the log processing module 368 process the data to generate certain types of log reports 372. It will be appreciated that the log data may be used in many different ways for different participants and parties of interest. For example, the log data may be used to generate log reports 372 for evaluating system performance (e.g., trends in performance or quality, quality statistics, etc.), evaluating personnel performance (e.g., tracking employee performance, audits, reviews, sick leave, hourly rates, etc., supplementing billing information (e.g., determining invoice data, finding billing issues or inefficiencies, etc.), or suggesting services or upgrades (e.g., suggesting new rules, security, or reporting functionality to a user or transcriptionist, etc.). The log processing module 368 may receive data from or pass data to other modules, including the server-side workflow processing module 352.

Embodiments of the server-side of the distributed transcription system 300 are in communication with a network 360 (e.g., a local network, a wide area network, the Internet, etc.). For example, the server-side of the distributed transcription system 300 may be in communication with the network 360 via the server-side workflow processing module 352, configured to manage network traffic relating to transcription and related services. In certain embodiments, the server-side workflow processing module 352 communicates the transcription assignment 356 to one or more of the client-sides of the distributed transcription system 400. The server-side workflow processing module 352 may also receive information from one or more of the client-sides of the distributed transcription system 400 over the network 360. For example, the server-side workflow processing module 352 may receive draft and/or final transcription products for routing to other participants, status updates on transcription assignments, data for synchronizing client and server data (e.g., as in the synchronization block 234 of FIG. 2), log data for use by the log processing module 368, etc. This and/or other data may be provided by various functionality of one or more of the client-sides of the distributed transcription system 400.

FIG. 4 shows a simplified block diagram of an embodiment of a client-side of a distributed transcription system, like the one shown in FIG. 3, according to various embodiments of the invention. As with the server-side of the distributed transcription system 300, embodiments of the client-side of the distributed transcription system 400 include a number of modules configured to receive, process, and generate data. The client-side of the distributed transcription system 400 may be in communication with the server-side of the distributed transcription system 300 via a network 360.

In certain embodiments, the client-side of the distributed transcription system 400 includes a client workflow manager 408 configured to perform certain high-level workflow management functions. In one embodiment, the client workflow manager 408 provides an interface for a transcriptionist by which the transcriptionist can see how many transcription assignments 356 are currently waiting in the transcriptionist's queue (e.g., and other information, like the status of certain transcription assignments 356). For example, the transcriptionist may log into a workflow management interface and select a transcription assignment 356 from a queue. Either before or after the selection is made, the transcription assignment 356 and/or related information may be downloaded to the client-side of the distributed transcription system 400. In some embodiments, the client-side of the distributed transcription system 400 receives the transcription assignment 356 from the network 360.

Embodiments of the client-side of the distributed transcription system 400 include a client-side data store 404 (e.g., like the client-side data store 244 of FIG. 2). In some embodiments, data in the client-side data store 404 is maintained by the client workflow manager 408. In one embodiment, the client workflow manager 408 provides certain synchronization functionality (e.g., like the synchronization block 234 of FIG. 2) for maintaining a level of synchronicity between data in the server-side of the distributed transcription system 300 and data in the client-side data store 404.

For example, when a transcriptionist accepts a transcription assignment 356, information relating to the transcription assignment 356 may be downloaded to the client-side data store 404. This data may include dictation data, form data, transcription rules, workflow rules, context data, log data, and/or any other useful data for supporting client-side transcription or related functionality. In some embodiments, the client workflow manager 408 periodically or constantly checks for, and possibly rectifies, discrepancies between the server-side and the client-side data.

It is worth noting that the synchronization functionality may be implemented in a number of ways, according to embodiments of the invention. For example, the server-side data may be stored in a particular file structure (e.g., a certain set of servers, directories, naming conventions, etc.), and the client-side data store 404 may be representative of that file structure (e.g., by using the same numbers, names, and types of data stores, but each likely containing less data than their server-side counterparts). In some embodiments, server-side data may be attributed (e.g., with certain types of flags) to define if, when, and/or how the data is transferred to the client-side data store 404.

Embodiments of the client-side of the distributed transcription system 400 include a transcription module 410. In some embodiments, the transcription module 410 functionality is provided as a module of the client workflow manager 408. The transcription module 410 may receive data from the client-side data store 404 that relates to the selected transcription assignment 356, and generate a transcription interface for use by a transcriptionist.

In some embodiments, the transcription module 410 provides some or all of the functionality of a word processing application, with additional transcription-specific functionality. In certain embodiments, the transcription-specific functionality includes synchronization between the audio dictation data and transcribed or auto-generated text. For example, the transcription module 410 may record the actions of the transcriptionist with timestamps, so as to synchronize when certain transcription actions were taken (e.g., when a particular word was typed, when a rule was triggered, etc.), with a particular time index in the audio dictation file (e.g., an elapsed time, a number of elapsed bits, etc.). In one embodiment, when the transcriptionist selects a portion of the transcribed text, an audio control (e.g., a slider) jumps to a location in the audio dictation file corresponding with the transcription of the text.

In other embodiments, the transcription module 410 provides functionality for interfacing with certain types of metadata that may be present in the dictation data. In one embodiment, the dictation data includes macro prompts. For example, a telephonic dictation interface may provide prompts to a user to aid in certain dictations (e.g., "Patient's Birth Date?"; [wait for response]; [confirm response]; "Patient's Weight" . . . ). In another embodiment, the metadata may include other dictation-related information, like time of call, originating phone number, user login information, etc. For example, the metadata may be used to identify the user (e.g., by recording a login identifier, the transcription system may look up information on the user, including name, occupation, employer, department, site, etc.). It may be desirable to use these and/or other types of metadata to enhance transcription functionality (e.g., by auto-filling certain fields of a transcription product form, by allowing the transcriptionist to jump to those sections in the audio file, by associating rules triggered by the text or indices set by the transcriptionist to associate with a specific location in the audio dictation data, etc.).

In still other embodiments, the transcription module 410 provides functionality tailored to the type of data being transcribed. In embodiments used in a medical transcription environment, certain medical functionality may be desirable. For example, a panel may be provided adjacent to a form text entry area, having various tabs for accessing patient data, user data, and other information. In certain embodiments, the transcription module 410 may display other panels for prompting the transcription with certain triggered rules (e.g., informational rules) or other useful information.

The transcriptionist may use the transcription interface provided by the transcription module 410 to generate a draft transcription product 248 from the dictation data 214 and/or other data. In some embodiments, the transcription module 410 further provides functionality for pre-validating the draft transcription product 248. For example, the transcription interface may provide spell checking, grammar checking, and/or pre-validation of certain data within the document (e.g., based on template, formatting, rules, etc.).

In some embodiments of the client-side of the distributed transcription system 400, pre-validation and/or other validation functionality is provided by a validation module 420. In some embodiments, the validation module 420 functionality is provided as a module of the client workflow manager 408. The validation functionality of the validation module 420 may be accessed in various ways.

In one embodiment, the validation functionality is accessed by the transcriptionist through the transcription interface. For example, the transcriptionist may run a validation routine from a menu provided by the transcription interface, at which point a rules engine may evaluate the current transcription text against a set of rules applicable to the transcription assignment 356. In another embodiment, the validation functionality is accessed by one or more quality control participants (e.g., mentors, editors, or auditors). For example, a quality control participant may access a transcription interface similar to the one used by the transcriptionist, or a dedicated interface for validating a draft transcription product 248 (e.g., with tailored functionality), through which the participant may run the validation routine. In still another embodiment, the validation routine may automatically run when certain conditions are met. For example, the validation routine may run periodically (e.g., once per hour), each time a draft transcription product 248 is saved, each time a draft transcription product 248 is submitted (e.g., to the validation module 420 from the transcription module 410), etc.

In some embodiments, the validation module 420 controls whether or not the draft transcription product 248 can proceed through the transcription system. In one embodiment, the validation module 420 will block sending of the draft transcription product 248 to quality control participants until triggered rules (e.g., error rules) have been resolved. In another embodiment, the validation module 420 will send the draft transcription product 248 back to the transcriptionist (e.g., from a quality control participant), prompting the transcriptionist to make certain corrections (e.g., and potentially blocking resubmission of the draft transcription product 248 until some or all of those corrections have been made).

Once the draft transcription product 248 has been validated by the validation module 420, a validated transcription product 254 is generated. In some embodiments, the validated transcription product 254 is delivered to a customer or other participant. In other embodiments, the validated transcription product 254 is passed to a delivery module 430 for further processing.

In some embodiments, the delivery module 430 receives the validated transcription product 254 and generates a final transcription product 264 for delivery to a customer. For example, the customer may have certain delivery preferences (e.g., report formatting, paper type, electronic file type, addressing, etc.). The delivery module 430 may receive an electronic file of a final transcription product 264, print it in a format adapted for the files of the customer, and generate a mailing label with the mailing information of the customer. In some embodiments, the final transcription product 264 is communicated over the network 360 to the customer or to the server-side of the distributed transcription system 400.

In some embodiments, the delivery module 430 (or another module, e.g., the client workflow manager 408) is configured to clean up the client-side data store 404. For example, information specific to the transcription assignment may be deleted from the client-side data store 404. This may be required or desirable, for example, to comply with record-keeping or privacy regulations, to prevent outdated versions of data from existing on the system, to save storage space, etc.

Embodiments of the client-side of the distributed transcription system 400 further include a logging module 440 for logging certain type, of client-side data to generate log data 444. In some embodiments, the transcription module 410 functionality is provided as a module of the client workflow manager 408. It will be appreciated that data may be logged from any useful part of the transcription environment, including any participant or module of the client-side of the distributed transcription system 400.

Some embodiments of the logging module 440 are in communication with some or all of the transcription module 410, the validation module 420, and the delivery module 430. Log data 444 may be logged from any of these and/or other sources. For example, logged data may include workflow logs (e.g., what assignments have been assigned and to whom, actual versus predicted completion times for assignments, etc.), error logs (e.g., what rules were triggered during the transcription process, what errors were identified during other quality control processes, whether the rules were resolved, at what level the rules were resolved, etc.), etc. In some embodiments, the log data 444 is communicated back to the server-side of the distributed transcription system 300 over the network 360.

It will be appreciated that the functionality of the various modules, data stores, and other elements of the client-side of the distributed transcription system 400 and the server-side of the distributed transcription system 300 (e.g., as in FIG. 3) may be implemented in many ways, according to embodiments of the invention. For example, while certain functionality and participants are described with reference to client-side or server-side elements, these designations are intended only for convenience and should not be construed as limiting the scope of the invention. In fact, any of the server-side functionality may be performed or implemented in one or more client-side elements, and any of the client-side functionality may be performed or implemented in one or more server-side elements.

Further, the various functionality of a distributed transcription environment (e.g., as shown in FIGS. 1-4) may be implemented in one or more computational systems, for example, by using the computational systems to interface with certain functionality or to execute the functionality by way of routines or applications. Embodiments of illustrative computational systems for providing server-side and client side transcription functionality are described with reference to FIGS. 5A and 5B, respectively.

Figure 5A:
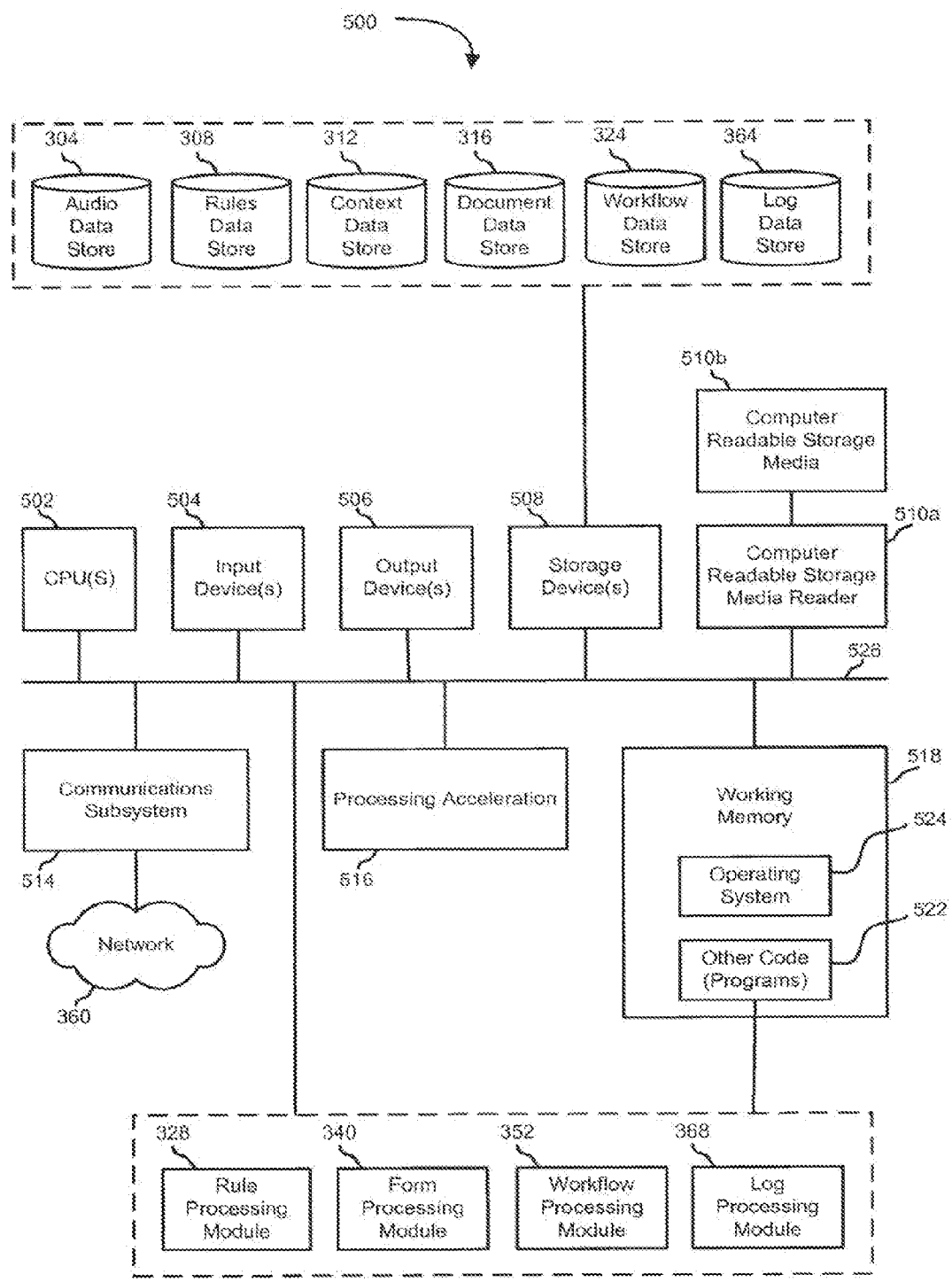
FIG. 5A shows an illustrative computational system for providing some or all of the functionality of a server-side of a distributed transcription system, like the one shown in FIG. 3, according to various embodiments of the invention.

FIG. 5A shows an illustrative computational system for providing some or all of the functionality of a server-side of a distributed transcription system, like the one shown in FIG. 3, according to various embodiments of the invention. The computational system 500 is shown having hardware elements that may be electrically coupled via a bus 526 (or may otherwise be in communication, as appropriate). The hardware elements may include one or more processors 502, including without limitation one or more general-purpose processors and/or one or more special-purpose processors (such as digital signal processing chips, graphics acceleration chips, and/or the like); one or more input devices 504, which can include without limitation a mouse, a keyboard, and/or the like; and one or more output devices 506, which can include without limitation a display device, a printer, and/or the like.

The computational system 500 may further include (and/or be in communication with) one or more storage devices 508, which can comprise, without limitation, local and/or network accessible storage and/or can include, without limitation, a disk drive, a drive array, an optical storage device, a solid-state storage device such as a random access memory ("RAM"), and/or a read-only memory ("ROM"), which can be programmable, flash-updateable, and/or the like. Embodiments of the storage devices 508 may include or provide functionality of a data storage module. For example, the storage devices 508 may include or be in communication with various server-side data stores (e.g., the audio data store 304, rules data store 308, context data store 312, document data store 316, workflow data store 324, and log data store 364 of FIG. 3).

The computational system 500 may also include a communications subsystem 514, which can include without limitation a modem, a network card (wireless or wired), an infra-red communication device, a wireless communication device and/or chipset (such as a Bluetooth device, an 802.11 device, a WiMAX device, cellular communication facilities, etc.), and/or the like. The communications subsystem 514 may permit data to be exchanged with one or more networks, including any networks or devices described herein (e.g., the network 360 of FIG. 3). In many embodiments, the computational system 500 will further comprise a working memory 518, which can include a RAM or ROM device, as described above.

The computational system 500 also may include software elements, shown as being currently located within the working memory 518, including an operating system 524 and/or other code, such as one or more application programs 522, which may include computer programs of the invention, and/or may be designed to implement methods of the invention and/or configure systems of the invention, as described herein.

Merely by way of example, functionality of one or more systems, components, or procedures described herein might be implemented as code and/or instructions executable by a computer (and/or a processor within a computer). A set of these instructions and/or code might be stored on a computer readable storage medium 510*b*. In some embodiments, the computer readable storage medium 510*b* is the storage device(s) 508 described above. In other embodiments, the computer readable storage medium 510*b* might be incorporated within a computational system, such as the system 500. In still other embodiments, the computer readable storage medium 510*b* might be separate from the computational system 500 (i.e., a removable medium, such as a compact disc, etc.), and/or provided in an installation package, such that the storage medium can be used to configure a general purpose computer with the instructions/code stored thereon. These instructions might take the form of executable code, which is executable by the computational system 500 and/or might take the form of source and/or installable code, which, upon compilation and/or installation on the computational system 500 (e.g., using any of a variety of generally available compilers, installation programs, compression/decompression utilities, etc.), then takes the form of executable code. In these embodiments, the computer readable storage medium 510*b* may be read by a computer readable storage media reader 510*a*.

In one embodiment, the invention employs the computational system to perform functionality of embodiments of the invention. According to a set of embodiments, some or all of the functions are performed by the computational system 500 in response to processor 502 executing one or more sequences of one or more instructions (which might be incorporated into the operating system 524 and/or other code, such as an application program 522) contained in the working memory 518. Such instructions may be read into the working memory 518 from another machine-readable medium, such as one or more of the storage device(s) 508 (or 510). Merely by way of example, execution of the sequences of instructions contained in the working memory 518 might cause the processor(s) 502 to perform one or more procedures of the methods described herein. In this way, the computational system 500 can be "configured to" or "operable to" perform any number of such procedures or methods.

It will be appreciated that all or some of the server-side functions of a distributed transcription system may be implemented as software or firmware components, dedicated hardware components, etc. In one embodiment, the working memory 518 includes code 522 for executing the functionality of various server-side modules (e.g., the rule processing module 328, form processing module 340, workflow processing module 352, and/or log processing module 368 of FIG. 3). In another embodiment, some or all of the functionality of those components may be implemented in dedicated or multi-purpose components that are in communication with the bus 526.

It is worth noting that the terms "machine readable medium" and "computer readable medium," as used herein, refer to any medium that participates in providing data that causes a machine to operate in a specific fashion. In an embodiment implemented using the computational system 500, various machine-readable media might be involved in providing instructions/code to processor(s) 502 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) (508 or 510). Volatile media includes, without limitation, dynamic memory, such as the working memory 518. Transmission media includes coaxial cables, copper wire, and fiber optics, including the wires that comprise the bus 526, as well as the various components of the communications subsystem 514 (and/or the media by which the communications subsystem 514 provides communication with other devices). Hence, transmission media can also take the form of waves (including, without limitation, radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequence of one or more instructions to the processor(s) 502 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 500. These signals, which might be in the form of electromagnetic signals, acoustic signals, optical signals, and/or the like, are all examples of carrier waves on which instructions can be encoded, in accordance with various embodiments of the invention.

The communications subsystem 514 (and/or components thereof) generally may receive the signals, and the bus 526 then may carry the signals (and/or the data, instructions, etc. carried by the signals) to the working memory 518, from which the processor(s) 502 may retrieve and execute the instructions. The instructions received by the working memory 518 may optionally be stored on a storage device 508 either before or after execution by the processor(s) 502. Notably, in certain embodiments, the communications subsystem 514, input devices 504, output devices 506, and/or other components of the computational system 500 may be used to communicate with one or more other computational systems 500 for increased or distributed functionality.

Figure 5B:
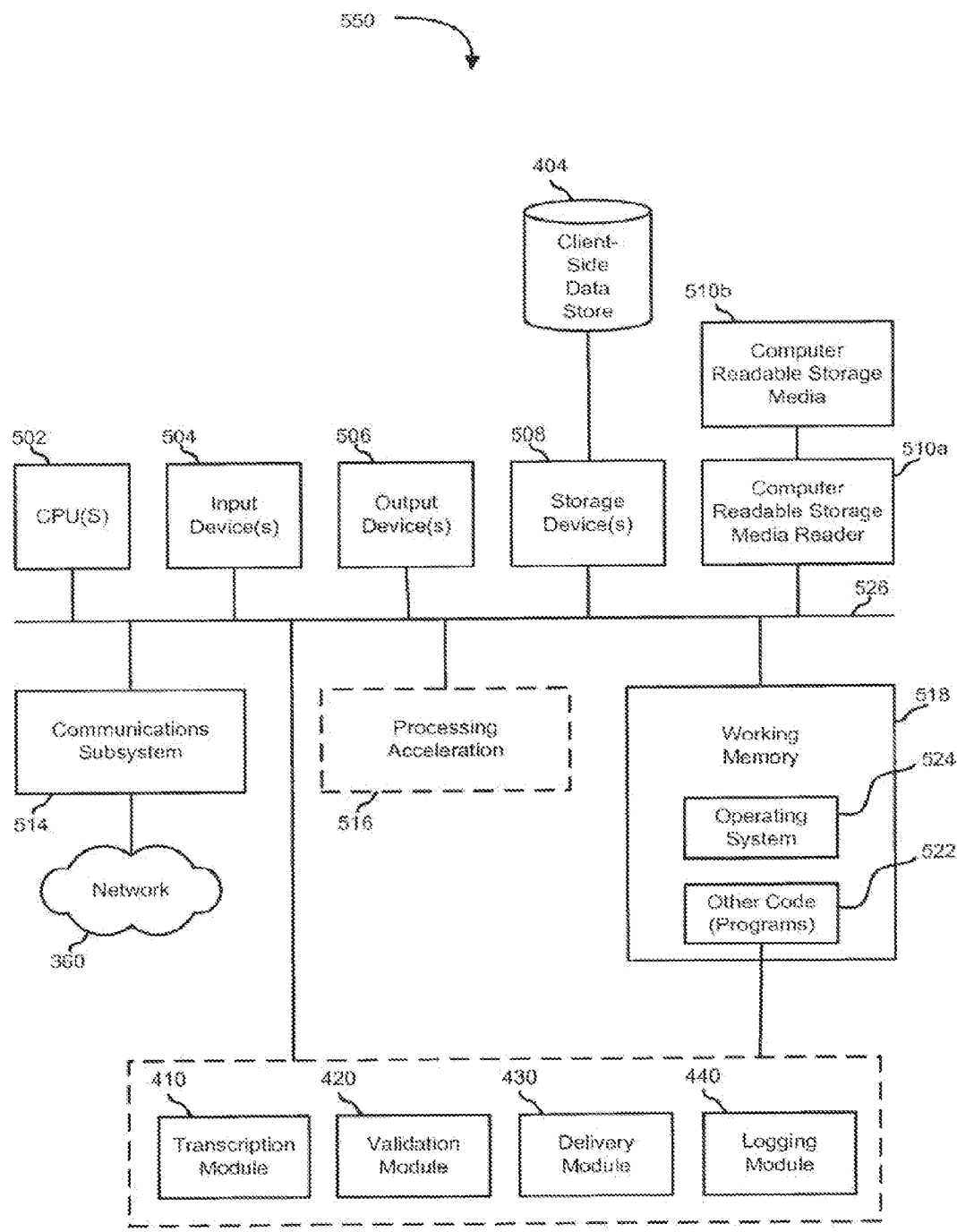
FIG. 5B shows an illustrative computational system for providing some or all of the functionality of a client-side of a distributed transcription system, like the one shown in FIG. 4, according to various embodiments of the invention.

A similar or different computational system may be used to provide client-side functionality of a distributed transcription environment. FIG. 5B shows an illustrative computational system for providing some or all of the functionality of a client-side of a distributed transcription system, like the one shown in FIG. 4, according to various embodiments of the invention. As with the computational system 500 of FIG. SA, the computational system 550 of FIG. 51 is shown having hardware elements that may be electrically coupled via a bus 526 (or may otherwise be in communication, as appropriate). The hardware elements may include one or more processors 502, input device 504, and output devices 506.

The computational system 550 may further include (and/or be in communication with) one or more storage devices 508. Embodiments of the storage devices 508 may include or provide functionality of a client-side data storage module (e.g., the client-side data store 404 of FIG. 4). In some embodiments, the storage device(s) 508 is or includes a computer readable storage medium 510*b*. In other embodiments, the computer readable storage medium 510*b* might be incorporated within a computational system, such as the system 550. In still other embodiments, the computer readable storage medium 150*b* is separate from the computational system 550, and may be read by a computer readable storage media reader 510*a*.

The computational system 550 may also include a communications subsystem 514, a working memory 518, and software elements (e.g., shown as being currently located within the working memory 518 and including an operating system 524 and/or other code, such as one or more application programs 522). It will be appreciated that all or some of the client-side functions of a distributed transcription system may be implemented as software or firmware components, dedicated hardware components, etc. In one embodiment, the working memory 518 includes code 522 for executing the functionality of various server-side modules (e.g., the transcription module 410, validation module 420, delivery module 430, and/or logging module 440 of FIG. 4). In another embodiment, some or all of the functionality of those components may be implemented in dedicated or multi-purpose components that are in communication with the bus 526.

It is worth noting that both the computational system 500 of FIG. SA and the computational system 550 of FIG. 5B may employ one or more of various types of data architectures, data formats, storage formats, etc. For example, various embodiments store data and/or implement various functionality using Clinical Document Architecture ("CDA") data formats, like HL7 (e.g., HL7 version 2.6 was approved as an ANSI standard on Oct. 12, 2007 under the title "Application Protocol for Electronic Data Exchange in Healthcare Environments Version 2.6").

Figure 6:
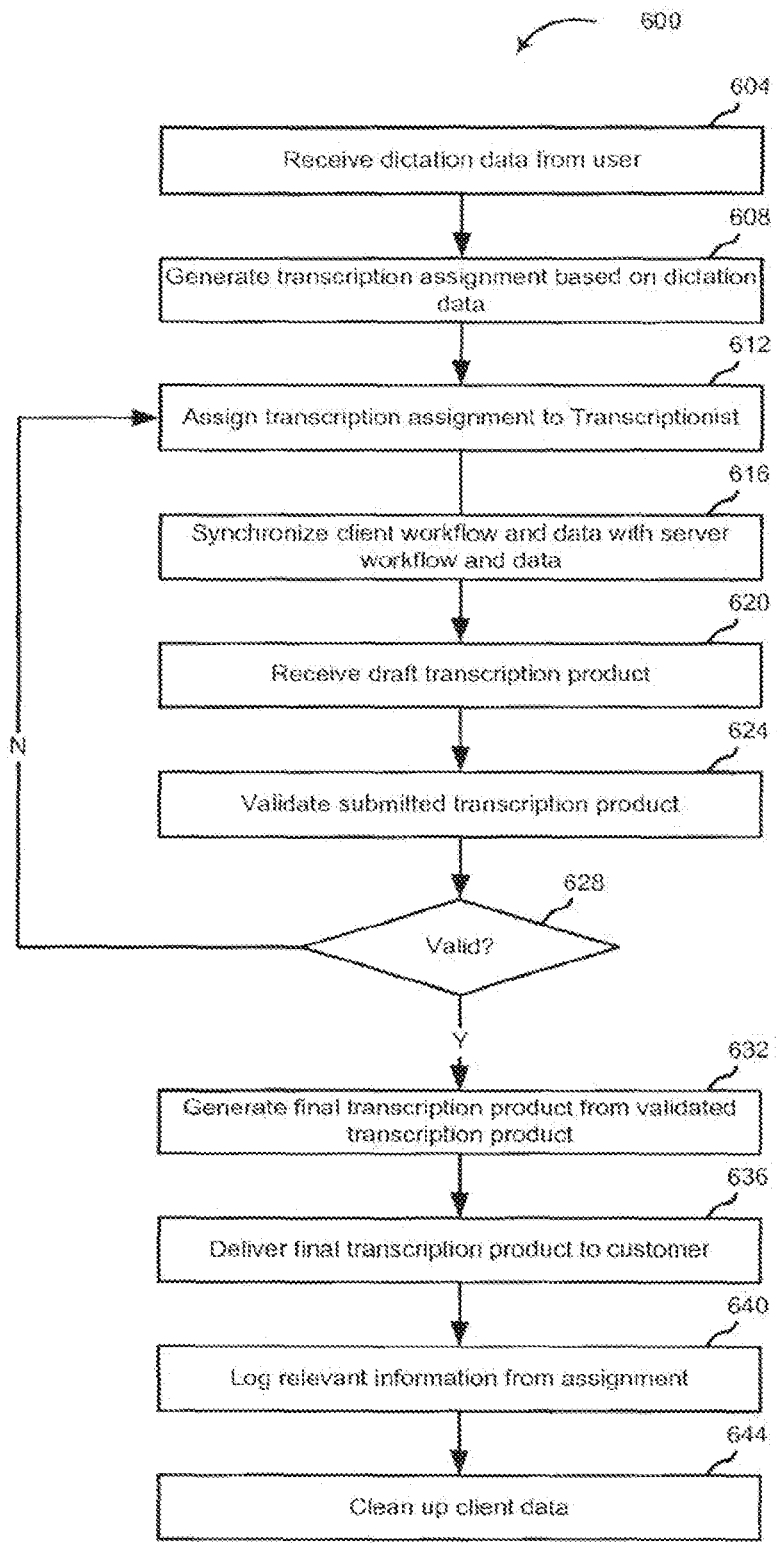
FIG. 6 shows a simplified flow diagram of an illustrative method fir server-side workflow management in a distributed transcription environment, according to various embodiments of the invention.
Figure 7:
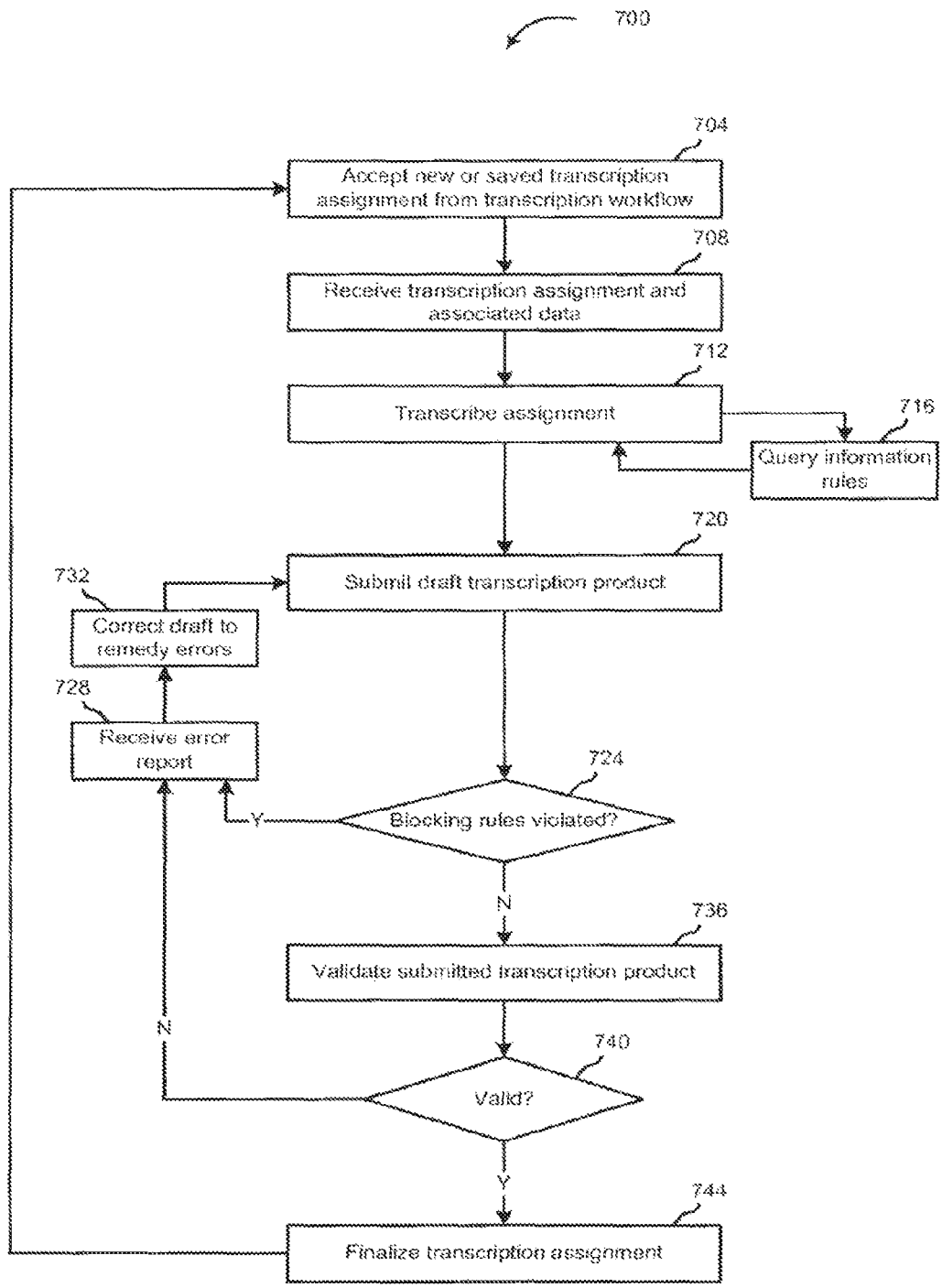
FIG. 7 shows a simplified flow diagram of an illustrative method for client-side workflow management in a distributed transcription environment, according to various embodiments of the invention.
Figure 8:
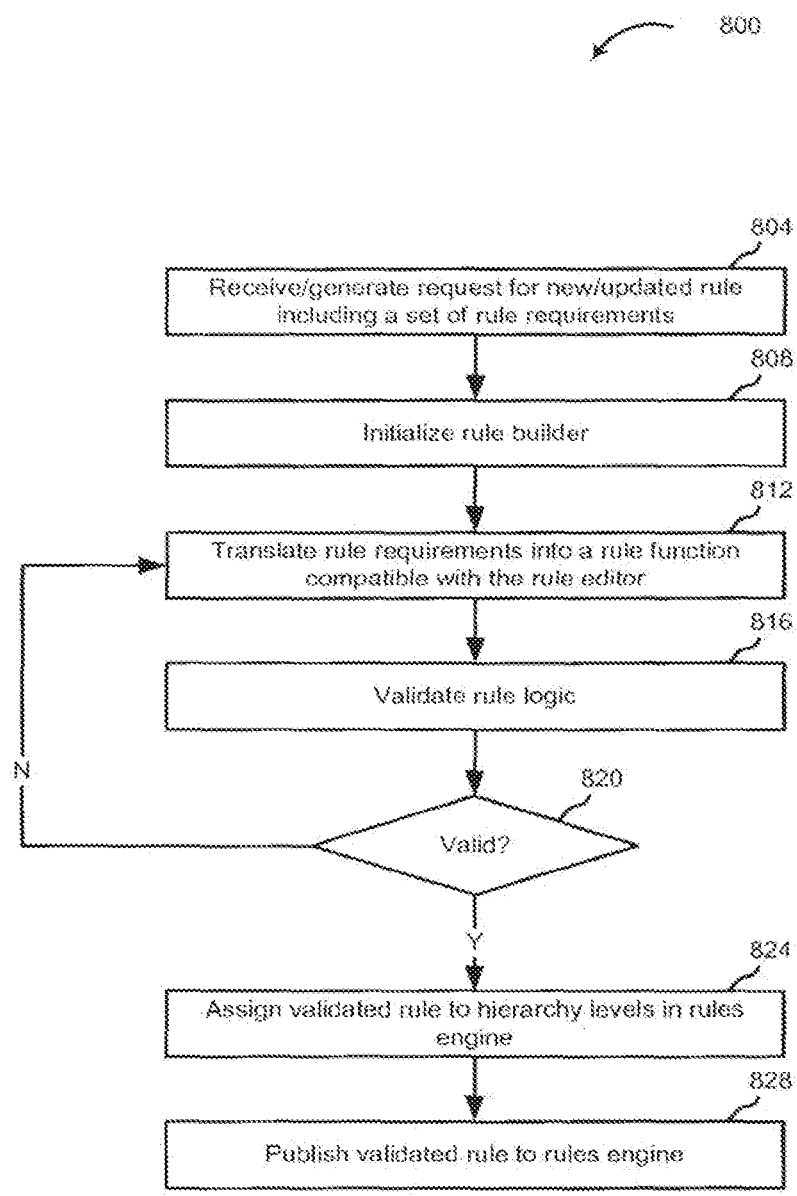
FIG. 8 shows a simplified flow diagram of an illustrative method for handling rules for use in a distributed transcription environment, according to various embodiments of the invention.

It will now be appreciated that many different types of systems may be used to implement functionality of a distributed transcription environment (e.g., as shown in FIGS. 1-5), according to various embodiments of the invention. FIGS. 6-8 provide illustrative flow diagrams of some method embodiment, that may be performed using systems embodiments of the invention, including those described above.

FIG. 6 shows a simplified flow diagram of an illustrative method for server-side workflow management in a distributed transcription environment, according to various embodiments of the invention. The method 600 begins at block 604 by receiving dictation data (e.g., an audio file) from a user. In block 608, the dictation data and/or other data is used to generate a transcription assignment.

In some embodiments, the transcription assignment is assigned to a transcriptionist in block 612. In block 616, client data may be prepared for the transcription assignment by synchronizing the server and client workflows and data (e.g., as part of the assignment in block 612, subsequent to the assignment in block 612, etc.). In certain embodiments, a draft transcription product is received at block 620 (e.g., from a transcriptionist, after the transcriptionist has transcribed the dictation data associated with the transcription assignment).

Embodiments of the method 600 may then validate the draft transcription product at block 624. The result of the validation may include a determination at decision block 628 of whether or not the draft transcription is valid. If the draft transcription product is invalid, the method 600 may return to block 612 to reassign the transcription assignment to the transcriptionist. For example, the validation in block 624 may generate certain data (e.g., triggered rules, etc.) that is passed back to the transcriptionist for correction.

If the draft transcription is determined in block 628 to be valid, the method 600 may generate a final transcription product from the validated transcription product at block 632. In block 636, the final transcription product may be delivered to the customer. It will be appreciated that embodiments of the method 600 may provide additional functionality. In some embodiments, in block 640, relevant information from or relating to the transcription assignment may be logged. In other embodiments, client data may be cleaned up in block 644 after the transcription assignment is submitted (e.g., at block 632).

FIG. 7 shows a simplified flow diagram of an illustrative method for client-side workflow management in a distributed transcription environment, according to various embodiments of the invention. The method 700 begins at block 704 with a transcriptionist accepting a new or saved transcription assignment from a client-side work flow manager. The transcription assignment and associated information may be received at block 708. At block 712, the transcriptionist may transcribe the assigned data.

Embodiments of the method 700 may include one or more levels of validation. In some embodiments, the transcriptionist may trigger (e.g., manually or automatically) certain information rules at block 716. In other embodiments, other rules may be manually or automatically evaluated or triggered during transcription. After the transcriptionist has completed a draft transcription product in block 712, the transcriptionist may attempt to submit the draft transcription product in block 720.

In some embodiments, submission of the draft transcription product in block 720 may initiate certain steps of the method 700. In certain embodiments, upon submission at block 720, a determination is made at decision block 724 of whether any blocking rules have been violated. Blocking rules may include any rules (e.g., warning or error rules) that have been designated as blocking final submission of a draft transcription product until the rules have been remedied.

If blocking rules have not been triggered, submission may continue to a validation stage at block 736. Validation of the draft transcription product at block 736 may include evaluating the draft transcription product against a set of rules (e.g., some or all of which having been created by a method like the method 800 of FIG. 8) The validation in block 736 may include a determination at decision block 740 of whether the draft transcription product is valid.

If blocking rules are deemed triggered in decision block 724 or if the draft transcription product is deemed not validated in decision block 740, the method 700 may trigger certain functionality. In some embodiments, the transcriptionist receives an error report at block 728 (e.g., prompts in a displayed panel in a transcription interface) indicating and/or describing the blocking and/or other rules that have been violated. At block 732, the transcriptionist may attempt to remedy the various triggered rules. After the triggered rules have been remedied in block 732, the transcriptionist may re-submit the draft transcription product in block 720. Blocks 720 . . . 740 may continue to loop until the transcription product is deemed valid at decision block 740.

Once the draft transcription product is deemed valid at decision block 740, the transcription assignment may be finalized at block 744. In some embodiments, finalizing the transcription assignment may include generating a final transcription product for delivery to a customer or other participant. In other embodiments, finalizing the transcription product includes cleaning up client-side data. In still other embodiments, finalizing the transcription product includes configuring the method to allow selection of a new transcription assignment (e.g., by returning to block 704).

It will be appreciated that some of the server-level functionality of FIG. 6 and some of the client-level functionality of FIG. 7 relates to rules handling. As described above with reference to certain system embodiments, there are many ways of providing rule handling functionality within the scope of various embodiments of the invention. FIG. 8 shows a simplified flow diagram of an illustrative method for handling rules for use in a distributed transcription environment, according to various embodiment, of the invention.

The method 800 begins at block 804 by receiving a request to build a rule. In some embodiments, the request includes new requirements for editing an existing rule. In other embodiments, the request includes requirements for building a new rule. For example, the requirements may be received from a participant (e.g., a user). In certain embodiments, the requests may only be received through certain administrative channels, from certain individuals or entities, or by certain individuals or entities.

Once the requirements have been received in block 8041, a rule builder (e.g., a rule building application) may be initialized at block 808. In some embodiments, the rule builder includes a rule building interface that provides various controls, functionality, access to available rule elements (e.g., operators, operands, operand functions, etc.). Embodiments of the rule builder may be initialized at block 808 based on certain entitlements. For example, certain functionality may be available only to certain types of account holders.

In some embodiments, at block 812, the rule requirements received in block 804 are translated into a rule function. The rule function may be adapted to be compatible with the rule builder initialized in block 808. In certain embodiments, the rule function may include standard types of logic (e.g., Boolean logic, etc.), plain language (e.g., which may be parsed within the rule builder), etc. For example, the rule may be defined by one or more expressions.

It may be desirable, in some embodiments, to minimize or prevent creation of invalid or incorrect rules by validating rules at block 816. This validation at block 816 may include making a determination at decision block 820 of whether or not the rule logic is valid. For example, the rule logic may be self-inconsistent or may not produce the desired result according to the request received in block 804. If the rule is determined to be invalid at decision block 820, the method 800 may return to block 812 for another attempt at translating the rule requirements into a rule function.

Embodiments of the method 800 may associate the rule with certain attributes at block 824. In one embodiment, the rule is assigned to certain hierarchies within the transcription environment. For example, a particular rule may be applied globally (e.g., to all hierarchies and accounts), or to a particular work location (e.g., United States. India, etc.), work role (e.g., transcriptionist, editor, user, etc.), account level (e.g., based on certain account preferences or entitlements), location level (e.g., department, site, etc.), worktype level (e.g., routine visit, radiology report, etc.), clinician level (e.g., radiologist, Dr. Smith, etc.). In certain embodiments, hierarchical rule management may be used to effect changes to a rule across one or more levels of the hierarchy without having to change the rule multiple times. For example, if a client has ten sites located around the world, the hierarchical rule framework may be configured so that modifying a rule associated with one site will automatically modify the rule for all other sites and/or other (e.g., subordinate) levels of the hierarchy, if desired.

If the rule is determined to be valid at decision block 820, the method 800 may publish the validated rule to a rule engine at block 828. The rule may then be available for use within the distributed transcription environment. For example, the rule engine may be configured to provide some or all of the rules (e.g., according to associated hierarchies) for use by the distributed transcription environment in evaluating transcription products (e.g., as part of the validation in block 624 of FIG. 6 or as part of the validation in block 736 of FIG. 7).

As discussed above, while the method 800 of FIG. 8 describes some embodiments of rules handling, many other embodiments are possible. One specific embodiment, implemented as part of a computer-implemented transcription environment (e.g., the computational system 550 of FIG. 51, the rule processing module 328 of FIG. 3, etc.), is described with reference to FIGS. 9-13. FIGS. 9-13 describe certain functionality of an application, titled "Quality Scan Rules," or "QSR."

QSR is an illustrative embodiment of rule handling implementation for a transcription environment, according to various embodiments of the invention. QSR is described as a software application with a graphical user interface ("GUI"). The GUI provides a user of QSR with access to various functionality, including rule generation, editing, publishing, and testing. In one illustrated function, a user may initialize a rule generation wizard.

Figures 9A, 9B:
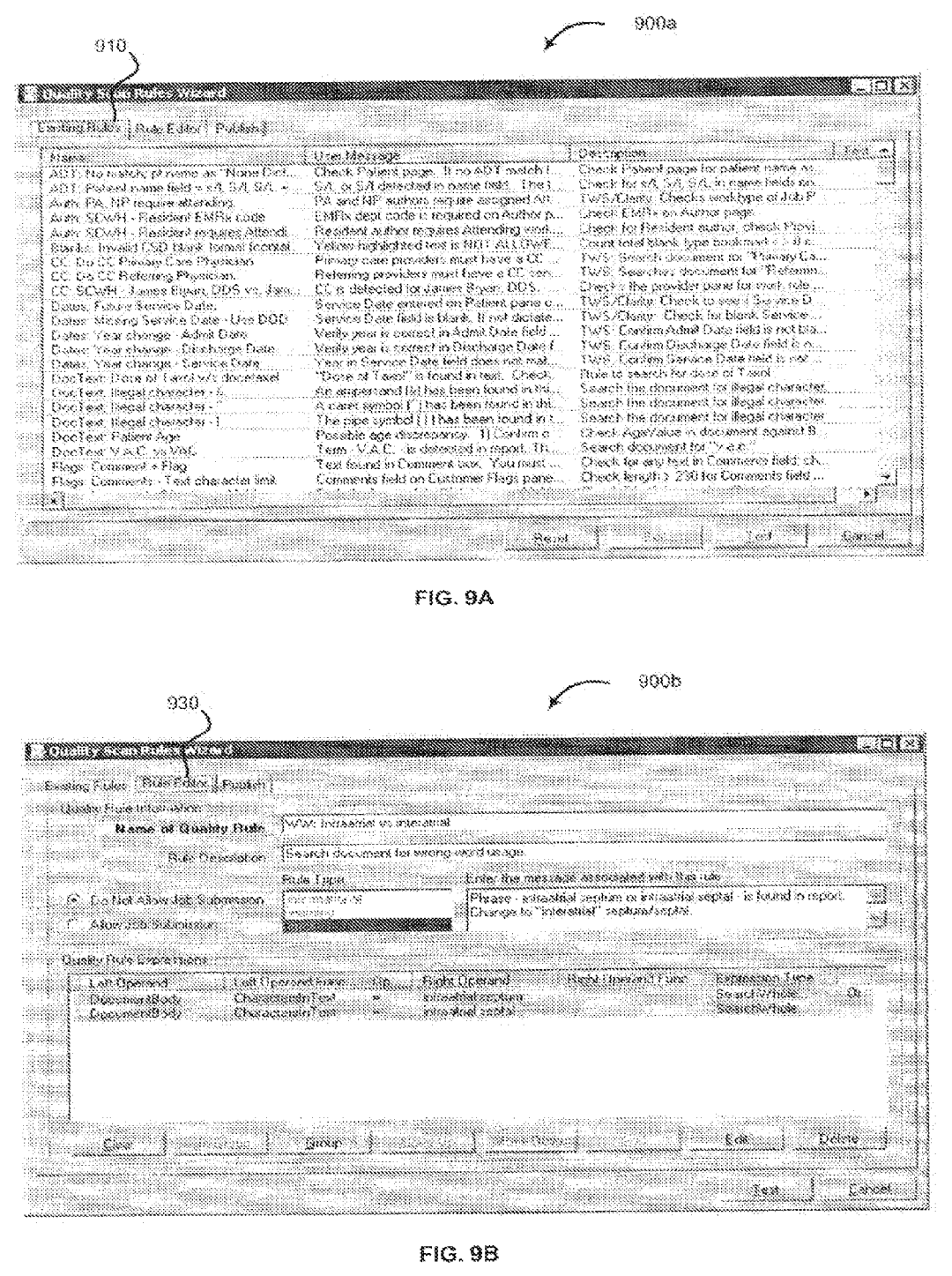

When the wizard first initializes, an existing rules tab is displayed, showing any rules that exist under a current job's domain. FIG. 9A shows an illustrative screen shot of an existing rules tab 910 in an embodiment of the rule generation wizard 900a. As illustrated, the existing rules tab 910 shows a number of columns, including a name column for indicating the name of the rule, a user message column for indicating message displayed to the user if the rule resolves to be displayed, a description column including a description of the rule, a test column for providing test results for the rule, and/or any other useful information about existing rules. These columns are used to effectively provide a list of illustrative rules that may be run against the job upon validation (e.g., when the transcriptionist tries to submit the job).

In certain embodiments, other functionality is provided. For example, in some embodiments, clicking on a "Test" button in the existing rules tab 910 while the existing rules tab 910 is active resolves each rule against the currently active job and displays the results to the user. Rows may highlight in red to indicate that the rule condition(s) associated with that row were not met (e.g., the rule would not be triggered anywhere in the job and would not be displayed to the user when the user either submits the job or manually runs QSR) and highlight in green to indicate that condition(s) were met (e.g., the rule would be triggered somewhere in the job and would be displayed to the user when the user either submits the job or manually runs QSR). In certain embodiments, the test column displays "True" if the rule resolved to be displayed and "False" if it will not be displayed. Other GUI elements may provide additional functionality. For example, as illustrated, a "Reset" button may be included in the existing rules tab 910.

In some embodiments, double clicking on a row or selecting a row and clicking an edit button (e.g., or otherwise interacting with a particular existing rule) will load that rule into a rule editor tab. FIG. 9B shows an illustrative screen shot of a rule editor tab 930 in an embodiment of the rule generation wizard 900*b*. As illustrated, the rule editor tab 930 includes various regions with information about the rule selected for editing. Some regions may correlate to regions of the existing rules tab 910. For example, there may be a "Name" region, a user message region, and a description region, substantially correlating with the name column, the user message column, and the description column of the existing rules tab 910, respectively. It is worth noting that certain text processing functionality may be provided. For example, embodiments of the user message column may be configured to allow the user message to be derived from the text that trigger the rule (e.g., if transcriptionists often confuse "interatrial" and "intraatrial," a rule may return the string "Phrase . . . 'intraatrial septum' . . . is found in report. Change to 'interatrial septum'", where the potentially confused words are automatically filled into fields).

As discussed above, various types of rules may be used for various reasons. In some embodiments, the rule editor tab 930 allows a selection of the rule type, for selecting whether the rule is, for example, an informational, a warning, or an error rule. In some embodiments, rule types are color coded or otherwise indicated (e.g., informational rules are green, warning rules are blue, and error rules are red). Text associated with the rules (e.g., when a rule-related message is displayed to the user) may also correspond to these colors or indicia.

Notably, some rules may indicate definite errors that must be fixed, while others may indicate possible or probable errors that may or may not need fixing. For example, many informational and warning rules may indicate certain information or warnings to the transcriptionist (e.g., or other validator). It may be at the discretion of the validator, or someone in the validation chain, to determine whether the trigger for the rule warrants a fix, at which point, the issue may be resolved. Many error rules, however, may require fixing before allowing submission of the transcription product. In some embodiments, the determination of whether to allow submission even when a particular rule is triggered is a function of the rule type (e.g., submission is allowed when informational or warning rules are triggered, but not when error rules are triggered). In other embodiments, the rule editor tab 930 includes a selection (e.g., a radio button or other GUI element) for indicating whether to allow submission.

Embodiments of the rule editor tab 930 also enable indication of the functionality, or conditions, of the rule. In some embodiments, the rule functionality is provided as one or more expressions, and the rule editor tab 930 shows a high level overview of each expression that makes up the rule conditions. For example, the rule illustrated may be triggered whenever a search of the text of the transcription product finds characters equal to either "intraatrial septum" or "intraatrial septal." It will be appreciated that may types of expression are possible, including many types of logic (e.g., plain language parsing, Boolean expressions, etc.), operands, operators, types, hierarchies (e.g., blocking or grouping, etc.), etc. Further, there may be no limit to the number of expressions allowed fir a particular rule.

The rule editor tab 930 may provide other functionality through other GUI elements. For example, the GUI may provide an Un-Group/Group button for creating groupings and hierarchies in the expressions (e.g., to force a particular order of operations), a Delete button for deleting an expression in the Expressions list, a Cancel button for canceling the rule editing dialog, etc. In some embodiments, a "Clear" button is provided in the GUI for clearing the current rule information and starting over with creating a rule. In certain embodiments, selecting the rule editor tab 930 when the wizard is first initialized generates essentially the same screen as if the "Clear" button is pressed while editing an existing rule. Certain embodiments include buttons for interacting with additional condition processing functions. For example, "Group" and "Un-Group" buttons (e.g., explained more below), "Move Up" and "Move Down" buttons, and/or other buttons or controls may be included in the rule editor tab 930.

Figure 10A:
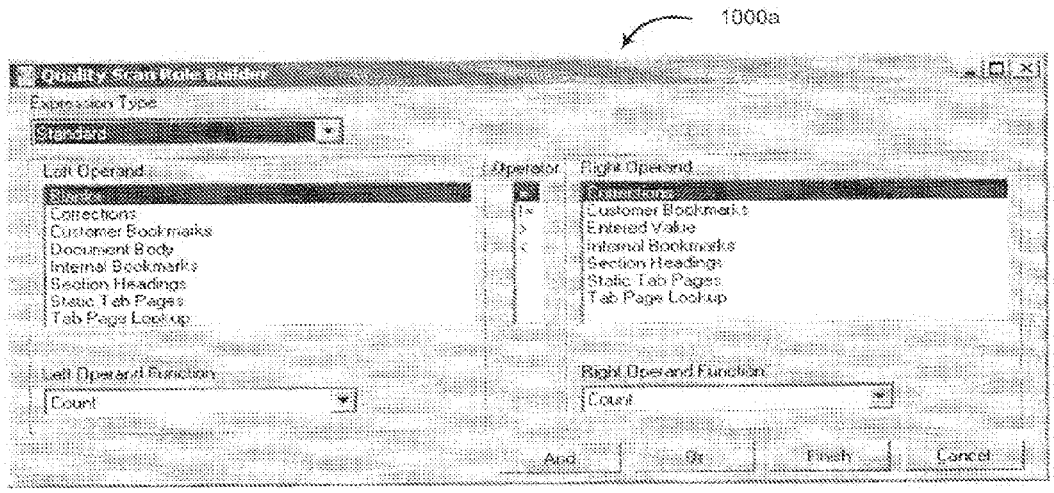
FIG. 10A shows an illustrative screen shot of a rule builder application in an embodiment of the rule generation wizard.

Embodiments of the rule creation wizard 900 additionally provide functionality for creating and/or editing individual expressions for use in defining rule conditions. In certain embodiments, clicking an "Add" button on the rule editor tab 930 will initialize a rule builder application. FIG. 10A shows an illustrative screen shot of a rule builder application 1000*a* in an embodiment of the rule generation wizard. As illustrated, the rule builder application 1000 may be configured to allow building of rules according to different rule types. The builder screen may add and remove controls and options based on user selections. The selected rule type in FIG. 10A is a "Standard" rule, indicating one category of rule formulated as a logical operator acting on left and right operands.

Many embodiments of expressions involve putting together two sets of operands with an operator between them. For example, this may limit possible invalid rules that could cause problems within the application. Many types of operand are possible. For example, operands may include: blanks (e.g., an inserted blank bookmark in the document, where a transcriptionist could not understand an audio dictation file), corrections (e.g., as included in the transcription product by proofers or auditors), customer bookmark (e.g., customer-specific bookmarks, like macro prompts or specific fields), document body (e.g., the body of the report, not including tab pages), internal bookmarks (e.g., bookmarks internal to the application, application provider, workflow manager, etc.), section headings (e.g., section headings in the document body), static tab pages (e.g., the set of tabs that include the job, internal flags, customer flags, etc.), tab page lookup (e.g., the dynamically built tabs like Author, CC, etc.), entered value (e.g., may only be available in the right operand for use in hard-coding a value), etc.

Figure 10B:
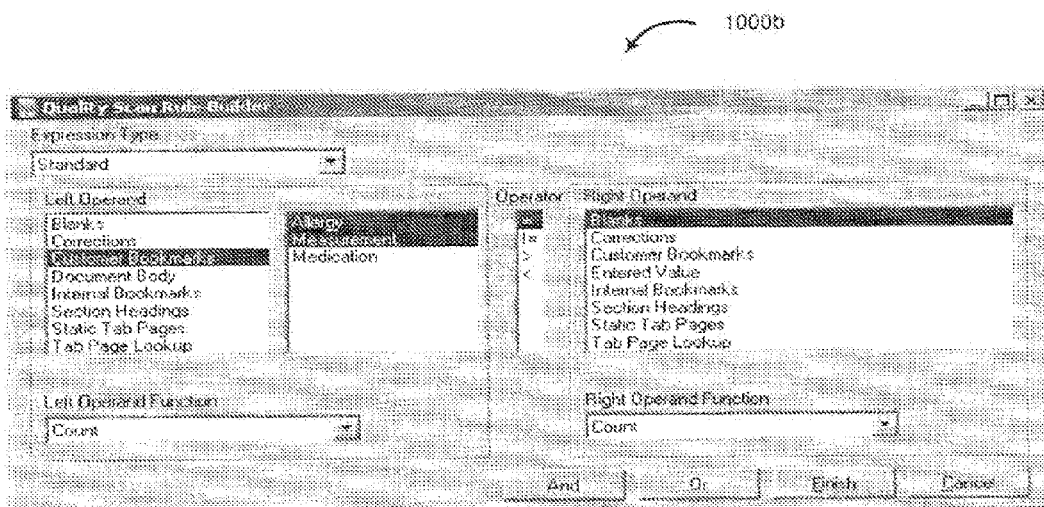
FIG. 10B shows one illustrative screen shot of the rule builder application, in which selecting "customer bookmarks" as the left operand reveals a list of available customer bookmarks in the adjacent window and available operators and right operands.
Figure 10C:
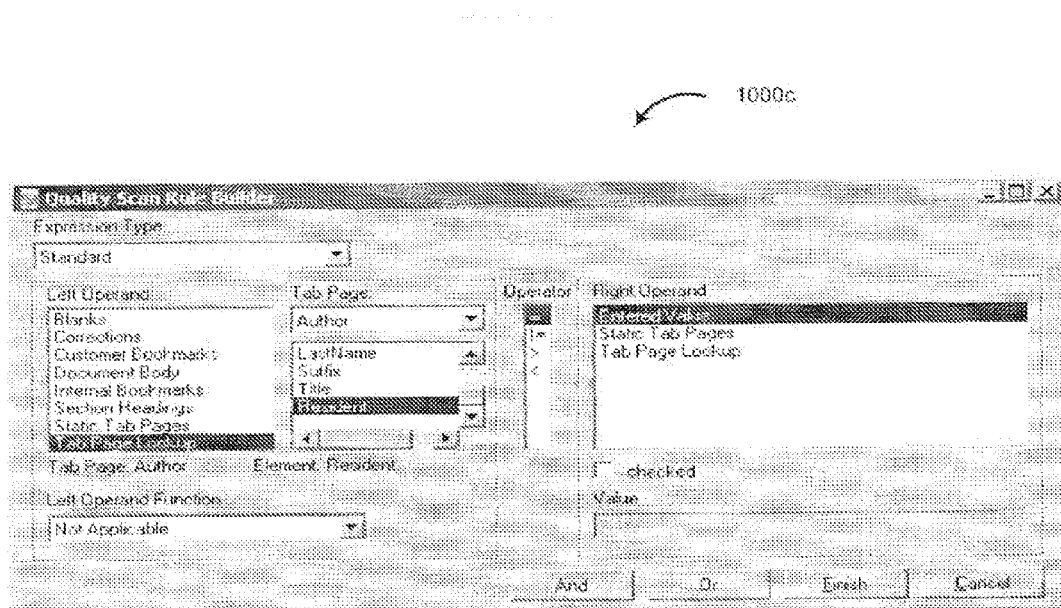
FIG. 10C shows another illustrative screen shot of the rule builder application, in which selecting "Static Tab Pages" or "Tab Page Lookup" reveals new controls on the builder screen.

A user may use the rule builder by working from left to right inside the builder. As certain selections are made, controls and selections may change on other portions of the builder FIG. 10B shows one illustrative screen shot of the rule builder application 1000*b*, in which selecting "customer bookmarks" as the left operand reveals a list of available customer bookmarks in the adjacent window and available operators and right operands. FIG. 10C shows another illustrative screen shot of the rule builder application 1000c, in which selecting "Static Tab Pages" or "Tab Page Lookup" reveals new controls on the builder screen. As illustrated in FIG. 10C, an upper combobox control displays a tab page name, while a lower listbox displays tab page elements. Of course any number or type of control may be displayed for various functionality. For example, if a control that is a checkbox is selected, the user interface may change to allow checking or un-checking the option.

In addition to the many types of operands possible, embodiments of the rule builder provide many types of operand functions for handling specific tasks relating to selected operands (e.g., which may be listed below the operand selections). Some illustrative operands are discussed herein, however, these are intended only to provide non-limiting examples of possible operands. One operand function may be "characters in text," which may look inside the text of the operand for whatever value it is being compared against. Another operand function may be "count," which may check for a count of how many iterations of a multi-entity exist. For example, count may be used to determine whether there is more than one CC in a report. Still other operand functions may include "First (num) Characters" and "last (num) Characters" for evaluating whether a certain sub-string is present at the beginning or end of a string. Yet other operand functions may include "Date Year," "Date Month." and "Date Day" for evaluating certain date fields and/or formats.

Figure 10D:
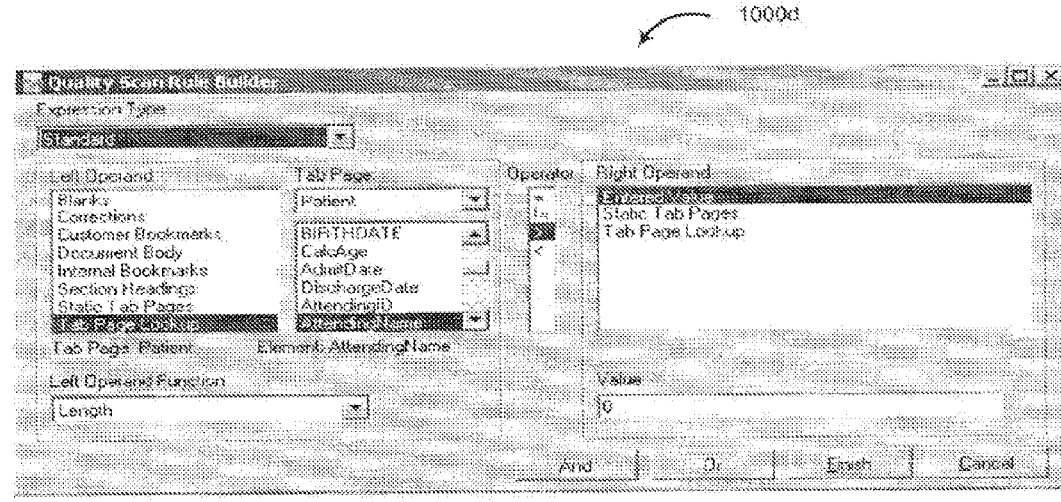
FIG. 10D shows an illustrative screen shot of the rule builder application, in which a rule is generated for evaluating whether an AttendingName field has been filled in on a patient tab.

Even another operand function may be "length," which may evaluate the length of a string. FIG. 10D shows an illustrative screen shot of the rule builder application 1000d, in which a rule is generated for evaluating whether an AttendingName field has been filled in on a patient tab. "TabPageLookup" is used as the left operand. "Patient: AttendingName" is set as the Tab Page to evaluate, Length is used as the left operand function, and the rule evaluates whether the "entered value" is greater than zero (">0").

While the expressions described above include various types of "standard" expressions, other categories of expressions may be available. In some embodiments, expressions may be available as "search" expressions. FIG. 10 shows an illustrative screen shot of the rule builder application 1000e, in which an embodiment of a "search" expression is shown.

Figure 10E:
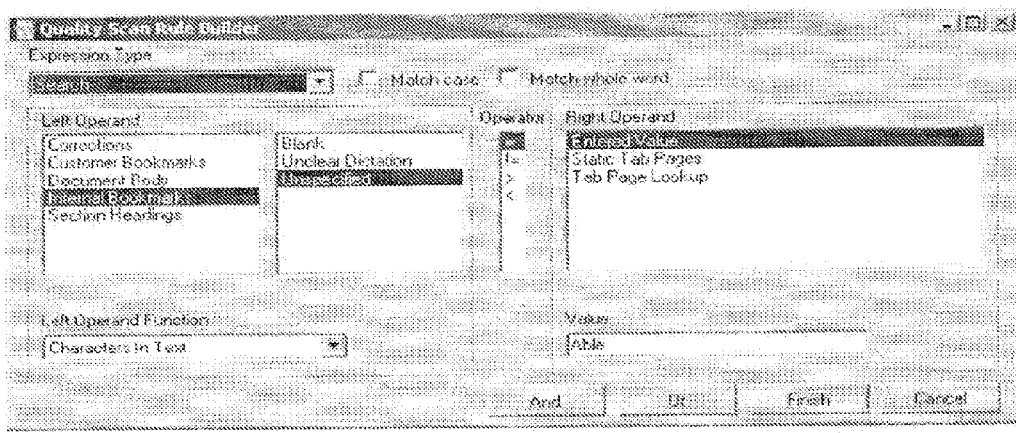
FIG. 10E shows an illustrative screen shot of the rule builder application, in which an embodiment of a "search" expression is shown.

The left operands illustrated in FIG. 10E include "Corrections." which evaluates corrections made to the transcription document (e.g., by an auditor or editor); "Customer Bookmarks." which evaluates certain customer-specified bookmarks (e.g., allergies, dictation macro prompts, etc.); "Document Body," which evaluates the body text of the document. "Internal Bookmarks," which evaluates non-customer-specific bookmarks; and "Section Headings," which evaluates information within specific hierarchical sections and/or sub-sections. Search expressions may also provide other functionality, like the option to search only for words of a certain case, only for entire words, etc. It will be appreciated that many other types of "search" expression are possible.

Embodiments of the rule builder application 1000 may provide many different types of functions. Additionally, the application may be continually updated to meet the requests of various customers and/or other parties. As such, the descriptions of specific functionality provided in this description should not be construed as limiting the scope of the QSR application or any other embodiments of the invention. For added clarity, some additional functionality is described below with reference to specific rule building examples.

Figure 10F:
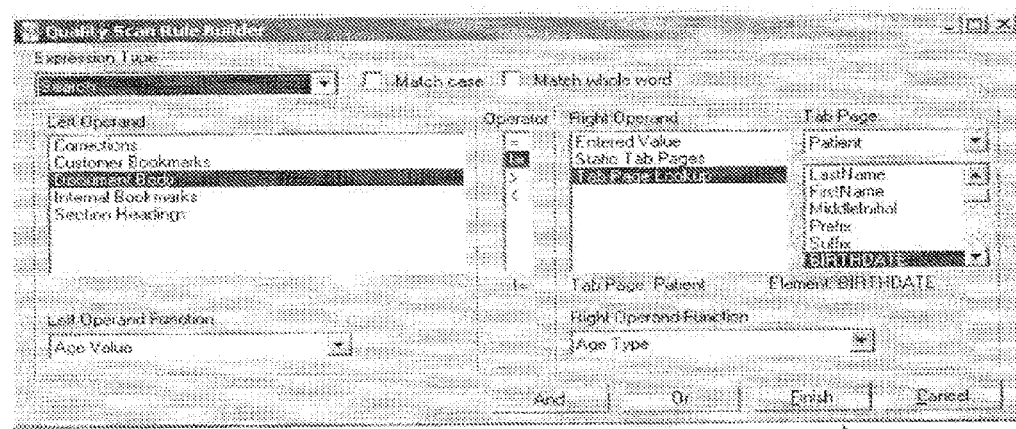
FIG. 10G shows an illustrative screen shot of the rule builder application, in which a function is provided called "Age Value," which becomes available when searching the document body.

In one embodiment, the count function may be used to count other types of document contents or parameters (e.g., the number of sections in a document). FIG. 10F shows an illustrative screen shot of the rule builder application 1000f, in which a function is provided called "Age Value," which becomes available when searching the document body. The "Age Value" function may scan the body of the transcription product for the age of the patient, looking for years, month, weeks, and days. The right operand indicates another function called "Age Type," relating to Tab Page "Patient: Birthdate." The application will evaluate the rule by reading the patient's birth date from the Patient tab, and converting the birth date to days, weeks, months, and years for the scan rule evaluation.

Figure 10G:
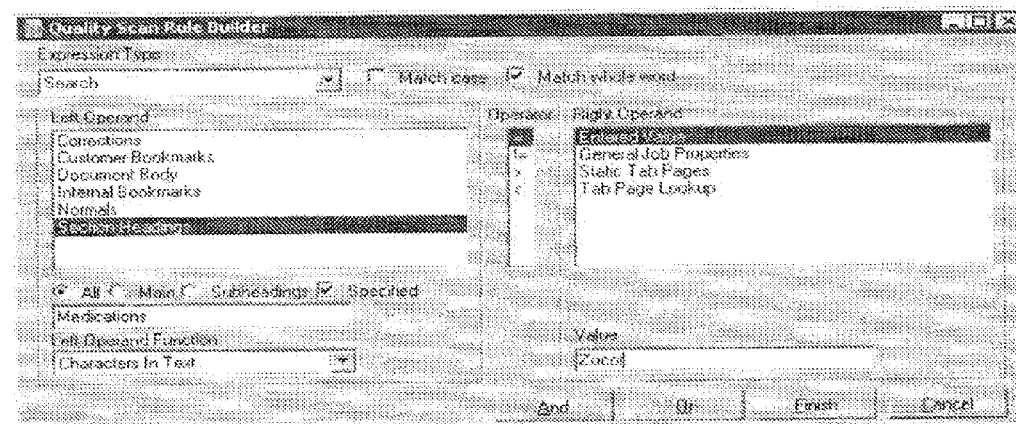

FIG. 10G shows another illustrative screen shot of the rule builder application 1000g, in which a function searches a particular section of the document for identified information. According to the illustrated expression, the left operand indicates that the expression will search section headings for the "Medications" heading. Text only within that section of the document will then be searched for the string "Zocor." Of course, other section headings may be searched, including subheadings, and other types of right operands may be used to identify other types of data within those sections.

Figure 11A:
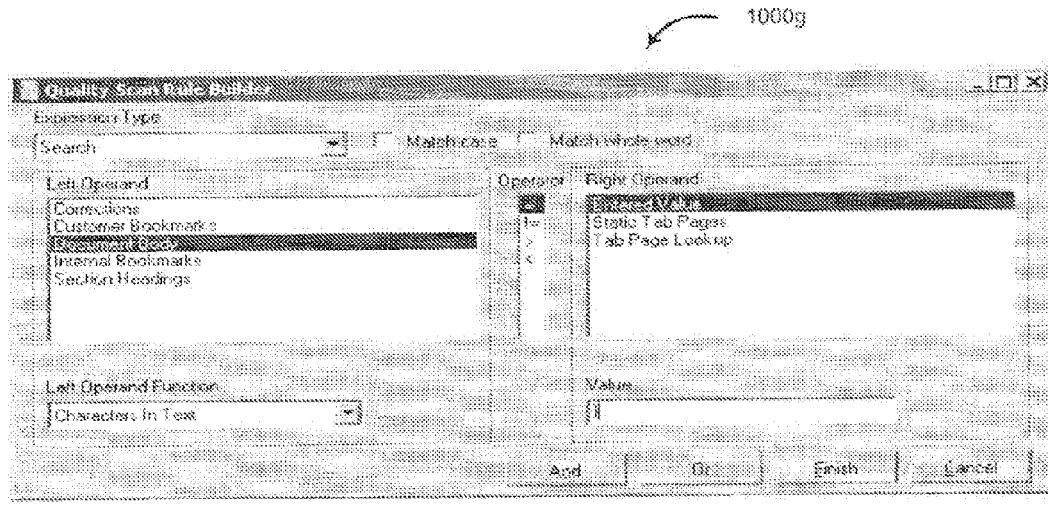
FIG. 11A shows one illustrative screen shot of the rule builder application, in which an expression is created for restricting a particular character identified as an illegal character for the transcription product.
Figure 11B:
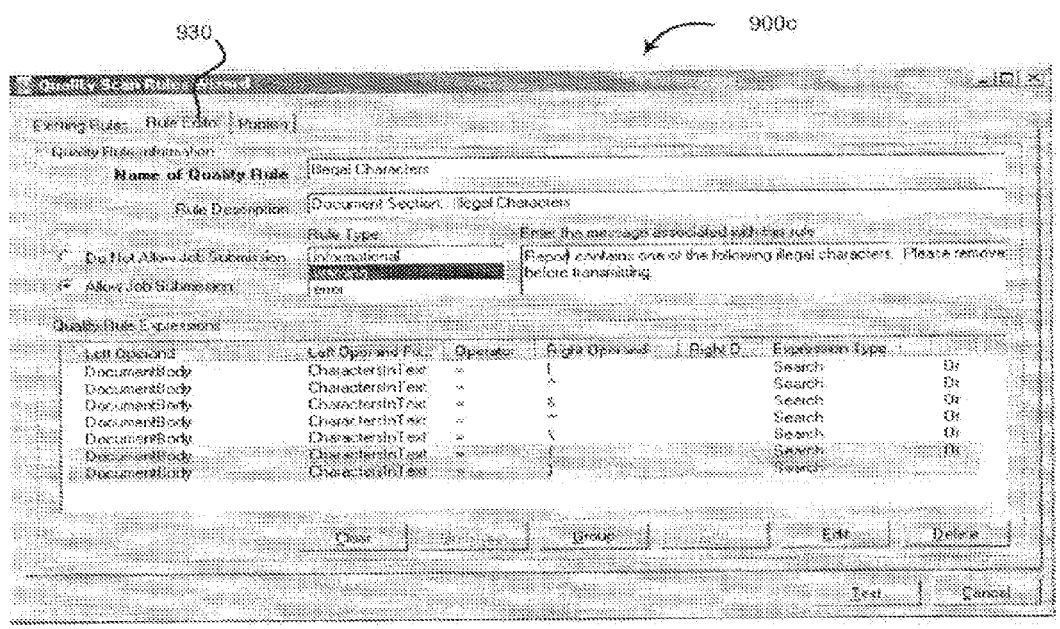
FIG. 11B shows an illustrative screen shot of the rule editor tab in an embodiment of the rule generation wizard for a rule that searches for all illegal characters for a transcription product.

It is worth noting that the rule builder application 1000 works together with other functionality of the rule generation wizard 900, like the rule editor tab 930. FIGS. 11A and 11B show use of the rule builder application 1000 to build expressions for part of a rule in the rule editor lab 930, respectively. FIG. 11A shows one illustrative screen shot of the rule builder application 1000g, in which an expression is created for restricting a particular character "}" identified as an illegal character for the transcription product (e.g., as part of the handling instructions agreed to with a particular facility). The expression illustrated in FIG. 11A effectively searches through the document body of the transcription product for all occurrences of the character.

FIG. 11B shows an illustrative screen shot of the rule editor tab 930 in an embodiment of the rule generation wizard 900c for a rule that searches for all illegal characters for a transcription product. It will be appreciated that the expression created in the rule builder application 1000g embodiment of FIG. 11A is one of a number of expressions used in the rule shown in FIG. 11B. In many embodiments, there is effectively no limit to the number of expressions allowed for a single rule. Each expression may be created independently, or otherwise, through the rule builder application 1000, to search through the document body for a particular illegal character. These expressions are combined into the full rule in the rule editor tab 930. It is worth noting that the rule message suggests removing the illegal characters prior to submitting the transcription product. However, the rule also indicates that job submission is allowed, even if the triggering condition(s) for the rule are not resolved.

Figures 12, 13:
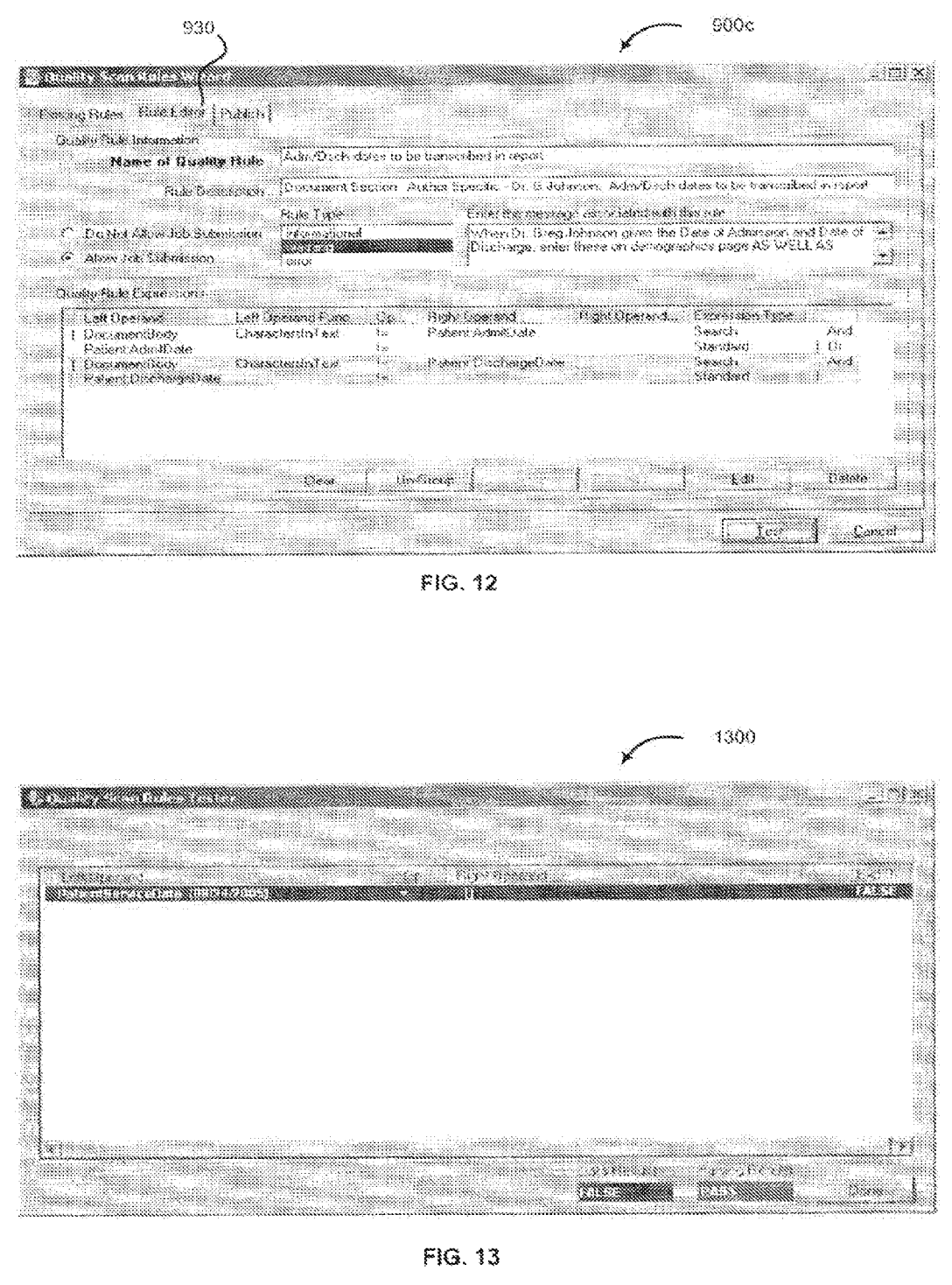

In addition to adding and editing expressions, embodiments of the rule builder allow the user to group expressions. FIG. 12 shows an illustrative screen shot of the rule editor tab 930 in an embodiment of the rule generation wizard 900c, in which grouping is used in a rule. For example, grouping expressions may change the overall rule logic by forcing a specific order of operations. The first condition illustrated in FIG. 12 evaluates whether the body of the report does not contain the admit date. The operand value "!=" represents not equal. The second line looks at the tab page admit date and evaluates whether it is filled in (i.e., not equal to empty). The third condition here evaluates whether the body of the report does not contain the discharge date. The final condition here evaluates whether the discharge date in the tab page is empty. The rightmost column of the listview containing the expressions shows the conditions (e.g., logical "And" and "Or").

Grouping expressions together may change the way that the overall rule evaluates. In this rule the first two lines are grouped together and the last two lines are grouped together. This is shown by the open parenthesis in the firm expression and the close parenthesis in the second expression. With the Or condition between the two groupings, this rule indicates that if either the first two expressions resolve true, or the last two expressions resolve true, then display the message.

As discussed above, after creating or editing a rule, it may be desirable to test the rule to ensure that the rule logic is valid and operates as intended. In some embodiments, a rule may be tested by clicking on a "Test" button on the rule editor tab 930. Clicking on the "Test" button may cause a new window to appear. An embodiment of a "Test" window 1300 is shown in FIG. 13. The results of each expression may be displayed to the user. In some embodiments, the results are color-coded. For example, if the background is green, that part of the expression is true; if it is red, it is false. The last column in the listview also shows the value spelled out. The two boxes at the bottom of the screen show you the overall results for the rule. The data results (e.g., color, value, etc.) may tell you whether or not the overall rule resolved as True or False. Additionally, the parsing results may indicate whether the rule is valid (e.g., whether the logic is self-consistent, whether the rule may publish, etc.).

In the case illustrated in FIG. 13, the rule is designed to evaluate whether the patient service data is blank. In the tested condition, the operand of the rule is "Aug. 24, 2005," not blank. As such, the expression evaluates as "FALSE." as indicated in the rightmost column and the Data Results box. The "FALSE" result, however, is the intended result, indicating that the rule appears to be operating properly. This is indicated by the "PASS" result in the Parsing Results box.

After creating, editing, and/or testing a rule, the rule may be published for use in the transcription environment. In some embodiments, the user is only allowed to select or restrict the locations for publication of the rule to domains falling below the existing domain in the domain hierarchy (e.g., the worktypes under the current location(s) and whether or not the rule is specific to the current author). Various domains may be available, including OrganizatioinID, SiteID, LocationID, LocationWorktypeID, PersonID, WorkLocationID and WorkRoleID. Clicking the publish button may publish the rule and return the results of the publication in a popup message.

In certain embodiments, publication will only be available (e.g., the "Publish" button will only be active) when minimum requirements for publishing a rule type have been met. For example, for an informational rule, publication may require Name and Message to be filled in. However, for warning or error rules, publication may additionally require conditions to be provided and pre-tested.

Figure 14:
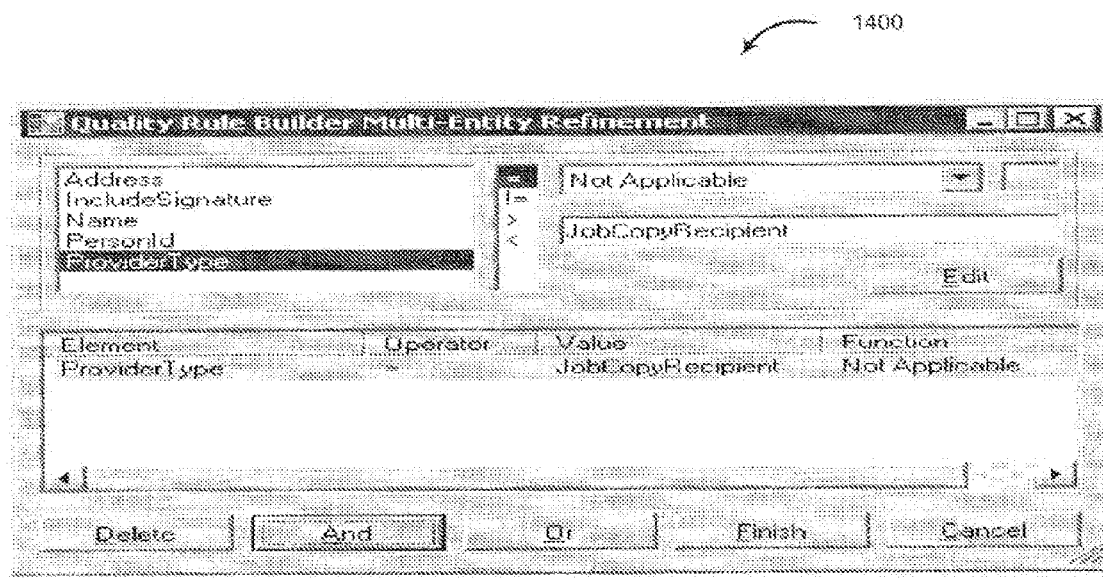
FIG. 14 shows additional rule building functionality illustrated by way of a multi-entity refinement screen.

Other GUI control and/or screens may be used to provide additional rule building functionality. In some embodiments, as shown in FIG. 14, additional rule building functionality is illustrated by way of a multi-entity refinement screen 1400. For example, certain types of rules include conditions that effectively filter a data type. If a later condition is configured to operate on the same data type with different filtering, it may not be processed properly by certain embodiments of the QSR application.

By way of example, a rule is created to ensure that all documents submitted by attending physician, Dr. Smith, are copied (e.g., "CC'd") to Dr. Johnson, the Chief of Medicine. A first condition is evaluated to look at provider types associated with the document to find the attending physician, and determine whether the attending physician is Dr. Smith (e.g., "ProviderType.AttendingPhysician='Dr. Smith'"). If so, a second condition is evaluated to look at provider types associated with the document to find the people copied upon submission, and determine whether the Chief of Medicine is included (e.g., "ProviderType.JobCopyRecipient='Dr. Johnson'"). One embodiment of the rules engine may evaluate the first condition by filtering all "ProviderType" data to "AttendingPhysician," effectively discarding the remaining "ProviderType" data. As such, evaluation of the second condition would not be evaluated as desired. The multi-entity refinement screen 1400 allows embodiments of the rule generation wizard 900 to process rules having multiple types of refinement to the same data type (e.g., multiple conditions of the came rule addressing different provider types).

Figures 15A, 15B:
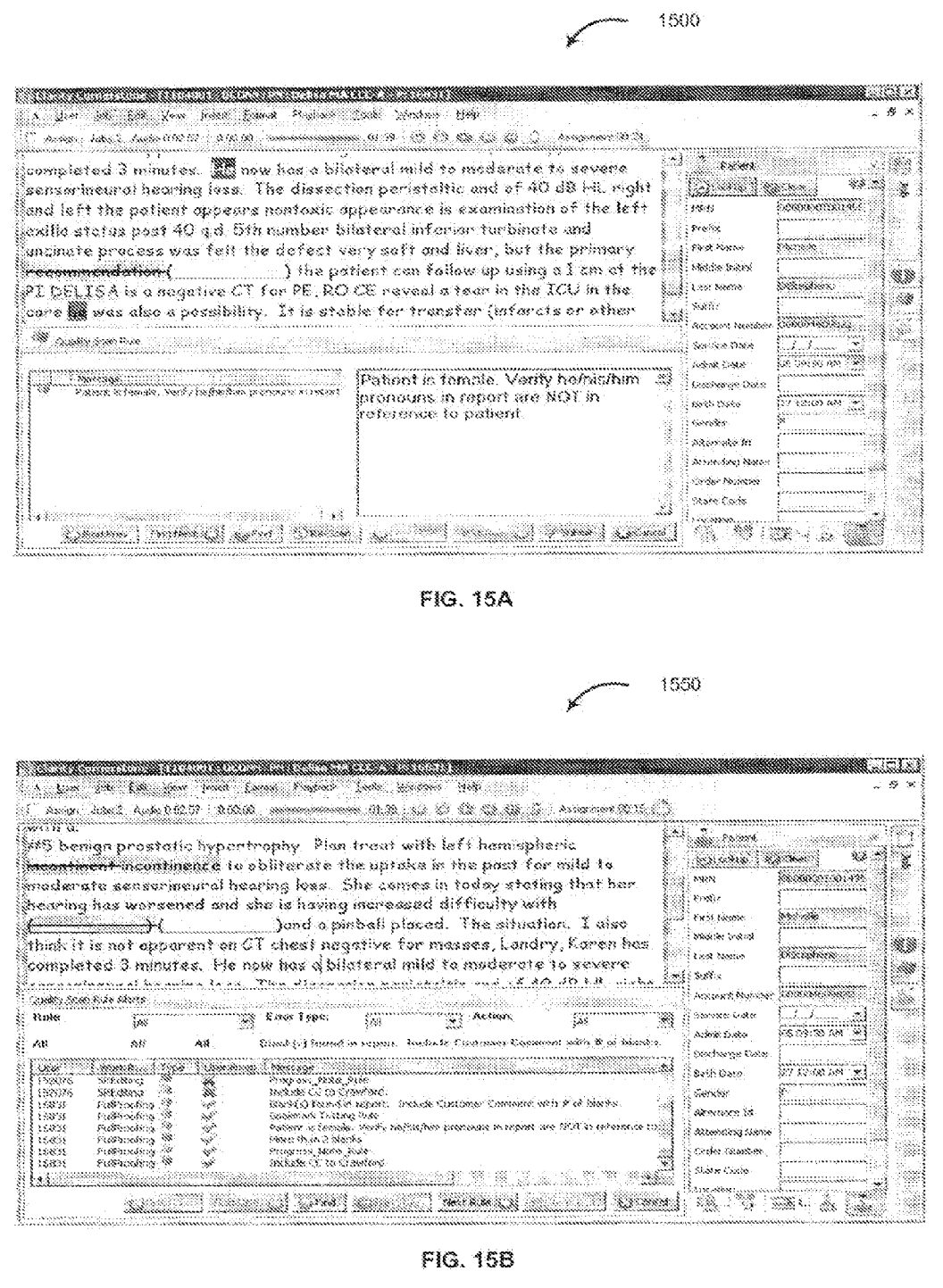

Once the rules are created and published, they may be applied to a transcription product to determine whether there are any rule violations in the product. FIG. 15A shows an illustrative screenshot of a transcription environment 1500 in which a rule violation is identified, according to various embodiments. The transcription environment 1500 may include any useful regions, GUI elements, etc. As illustrated, the transcription environment 1500 includes a transcription text region that shows the text of the transcription product, and a QSR region that shows identified rule violations and corresponding descriptions.

In one embodiment, one rule violation is found in the transcription product. In particular, the rule is configured to identify the sex of the patient and determine whether correct pronouns are used in the transcription text to describe the patient according to the patient's sex. As illustrated, the patient is identified as a female (e.g., according to patient data, as shown in a patient data region of the transcription environment 1500). A rule is invoked that includes the rule message: "Patient is female. Verify he/his/him pronouns in report are not in reference to patient." An occurrence of the rule violation is identified in the transcription text region of the transcription environment 1500 as highlighted text (the term "He" is highlighted). It will be appreciated that the validator (e.g., the transcriptionist, auditor, etc.) may then choose to ignore the rule, correct the transcription text where appropriate, validate that the text is correct as is (e.g., the "He" refers to a male individual that is not the patient), etc.

After the transcription product is validated using the rules, or otherwise submitted, various levels of auditing may occur, as described above. For example, a transcription assignment may include data supplied by an author through a speech recognition system. The first level of transcription may be performed by a speech recognition system (e.g., a software application). A second level of transcription may then be performed by a human transcriptionist acting as a speech recognition editor. For example, rather than the human transcriptionist actually transcribing the author's audio from scratch, the human transcriptionist may merely edit mistakes in the speech recognition's automatic transcription of the audio. A proofer may then proofread the document prior to submission.

FIG. 15B shows another illustrative screenshot of a transcription environment 1550 in which an auditor can see what rule violations have been identified and what remedial action has occurred, according to various embodiments. As in FIG. 15A, the transcription environment 1500 may include any useful regions, like a transcription text region, and a QSR region. In FIG. 15B, however, the QSR region may be configured to show data that is useful for auditing the transcription workflow and/or quality.

As illustrated, a number of rule violations were identified when the transcription rules were applied to the original transcription product. For example, the original transcription product may include text generated automatically by a speech recognition system. The QSR region may show that some rules were identified to a speech recognition editor and others were provided to a proofer (e.g. each of the editor and proofer being identified by a user ID). Additionally, the QSR region may indicate what rule was violated, whether the particular user fixed the rule, what fix was performed, and/or any other useful information for the auditor. The auditor may be provided with additional functionality, such as the ability to scroll through the list, filter the list (e.g., on role, error type, action, etc.), process statistical metrics, run reports, etc.

It will be apparent to those skilled in the art that substantial variation, may be made in accordance with specific requirements to all of the systems, methods, software, and other embodiments described above. For example, customized hardware might also be used, and/or particular elements might be implemented in hardware, software (including portable software, such as applets, etc.), or both. Further, connection to other computing devices such as network input/output devices may be employed.

While the invention has been described with respect to exemplary embodiments, one skilled in the art will recognize that numerous modifications are possible. For example, die methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents.

What is claimed is:

1. A method for rules handling in a distributed transcription system, the method comprising:
    receiving a transcription assignment at a computer-implemented transcription environment, the transcription assignment comprising:
        dictation data comprising audio information dictated by an author into a dictation interface, the author being associated with a context designation; and
        a transcription rule set being one of a plurality of transcription rule sets stored in a rules data store and generated for application to the dictation data as a function of the context designation, the context designation including at least one context tag indicating a context for the transcription assignment, wherein the at least one context tag is associated with at least one of a plurality of transcription rules, and wherein the context designation is associated with a prompt provided to the author substantially when the author dictated the dictation data, and wherein the transcription rule set includes at least one of a warning rule or an error rule, the warning rule including a trigger based on a condition indicating a possible error, the error rule including a trigger based on a condition indicating a definite error;
    receiving transcription data at the computer-implemented transcription environment from a transcriptionist via a transcription interface, the transcription data comprising textual representations of corresponding portions of the dictation data, the textual representations being at least partially synchronized with the corresponding portions of the dictation data;
    identifying a rule violation by applying the transcription rule set to the transcription data after receiving the transcription data using the computer-implemented transcription environment, the rule violation being associated with a textual representation and substantially synchronized with the corresponding portion of the dictation data, the application of the transcription rule set triggering at least one of the warning rule or the error rule; and
    displaying an indication of the rule violation to the transcriptionist via the computer-implemented transcription environment.

2. The method of claim 1, further comprising:
    receiving an interaction with the computer-implemented transcription environment from the transcriptionist indicating a selection of the rule violation;
    in response to receiving the interaction, configuring playback of the audio information from a position associated with the corresponding portion of the dictation data substantially synchronized with the rule violation.

3. The method of claim 1, wherein the transcription assignment is received at the computer-implemented transcription environment from a workflow management server over a communications network, the workflow management server being communicatively coupled with the rules data store and configured to:
    receive the dictation data from the author, the author being one of a plurality of authors in communication with the workflow management server over the communications network;

identify the transcription rule set from the rules data store for application to the dictation data;

generate the transcription assignment, such that the transcription assignment comprises the dictation data and the transcription rule set and is formatted for use in the computer-implemented transcription environment;

assign the transcription assignment to the transcriptionist, the transcriptionist being one of a plurality of transcriptionists in communication with the workflow management server over the communications network; and communicate the transcription assignment over the communications network to the transcriptionist for use in the computer-implemented transcription environment.

4. The method of claim 1, wherein the context designation comprises a plurality of context tags that indicate the context for the transcription assignment, each of the plurality of context tags being associated with the plurality of transcription rules, and wherein the transcription rule set is derived from the plurality of transcription rules.

5. The method of claim 4, wherein each context tag indicates at least one of an organization identifier, a site identifier, a location identifier, a work type identifier, an author identifier, an author type identifier, an author role identifier, a work role identifier, a dictation interface identifier, or a transcriptionist identifier.

6. The method of claim 4, further comprising: determining the context designation by identifying the context tags associated with the dictation data, wherein at least some of the context tags are identified by analyzing the dictation data.

7. The method of claim 4, further comprising: determining the context designation by identifying the context tags associated with the dictation data, wherein at least some of the context tags are associated with prompts provided to the author substantially when the dictation data is dictated by the author.

8. The method of claim 1, wherein receiving transcription data at the computer-implemented transcription environment from the transcriptionist comprises:

playing the audio information comprised by the dictation data from the computer-implemented transcription environment to the transcriptionist;

receiving the transcription data during playback of the audio information, such that at least some of the textual representations are received via the transcription interface substantially as the respective corresponding portions of the dictation data are being played to the transcriptionist.

9. The method of claim 1, further comprising: providing a transcription template to the transcriptionist configured to receive the transcription data from the transcriptionist via the transcription interface, the transcription template being generated at least according to the set of transcription rules.

10. The method of claim 1, wherein identifying the rule violation by applying the transcription rule set to the transcription data using the computer-implemented transcription environment comprises:

applying the transcription rule set to the transcription data substantially while receiving the transcription data from the transcriptionist via the transcription interface, such that identifying the rule violation occurs substantially in real time while receiving the transcription data.

11. The method of claim 1, further comprising:
receiving an instruction to validate the transcription data, wherein identifying the rule violation occurs substantially in response to receiving the instruction.

12. The method of claim 1, wherein the set of transcription rules comprises:

an information rule configured to trigger a rule violation as a function of an association between the dictation data and a context tag associated with the information rule, regardless of the transcription data received from the transcriptionist, a triggering of the information rule indicating information relating to a handling instruction associated with the dictation data;

a warning rule configured to trigger a rule violation as a function of applying the warning rule to the transcription data received from the transcriptionist, a triggering of the warning rule indicating a possible error in the transcription data; and an error rule configured to trigger a rule violation as a function of applying the error rule to the transcription data received from the transcriptionist, a triggering of the error rule indicating a definite error in the transcription data.

13. The method of claim 1, further comprising:
receiving a submission instruction from the transcriptionist at the computer-implemented transcription environment that a transcription product comprising the transcription data received from the transcriptionist is complete; and validating the transcription product automatically in response to receiving the submission instruction, validating the transcription product comprising identifying the rule violation.

14. The method of claim 13, further comprising: when validating the transcription product comprises identifying triggering of an error rule indicating a definite error in the transcription data, preventing submission of the transcription product while the rule violation persists.

15. The method of claim 13, further comprising: substantially upon completion of validating the transcription product, generating a log characterizing performance of at least one of the transcription environment or the transcriptionist.

16. The method of claim 15, further comprising: receiving the log associated with the transcription assignment at a workflow management server, the log being one of a plurality of logs associated with a plurality of transcription assignments, the workflow management server being configured to adjust a workflow metric as a function of the plurality of logs and to assign transcription assignments to one or more of a plurality of transcriptionists as a function of the workflow metric.

17. The method of claim 1, wherein the transcriptionist is a computer-implemented speech recognition application.

18. A system for rules handling in a distributed transcription system, the system comprising:

a transcription module, configured to:
receive a transcription assignment, the transcription assignment comprising:

dictation data comprising audio information dictated by an author into a dictation interface, the author being associated with a context designation; and a transcription rule set being one of a plurality of transcription rule sets stored in a rules data store and generated for application to the dictation data as a function of the context designation, the context designation including at least one context tag indicating a context for the transcription assignment, wherein the at least one context tag is associated with at least one of a plurality of transcription rules, and wherein the context designation is associated with a prompt provided to the author substantially when the author dictated the dictation data, and wherein the transcription rule set includes at least one of a warning rule or an error rule, the warning rule including a trigger based on a condition indicating a possible error, the error rule including a trigger based on a condition indicating a definite error;

receive transcription data via a computer-implemented transcription environment from a transcriptionist via a transcription interface, the transcription data comprising textual representations of corresponding portions of the dictation data, the textual representations being at least partially synchronized with the corresponding portions of the dictation data; and generate a draft transcription product comprising the transcription data; and a validation module, communicatively coupled with the transcription module, and configured to validate the draft transcription product to generate a validated transcription product by:

identifying rule violations by applying the transcription rule set to the transcription data after receiving the transcription data, each rule violation being associated with a textual representation and substantially synchronized with the corresponding portion of the dictation data, the application of the transcription rule set triggering at least one of the warning rule or the error rule; and resolving each rule violation.

19. The system of claim 18, wherein resolving each rule violation comprises:

providing an indication of the rule violation to the transcriptionist; and receiving a resolution instruction from the transcriptionist at the validation module.

20. The system of claim 19, wherein resolving each rule violation further comprises:

receiving an interaction with the computer-implemented transcription environment from the transcriptionist indicating a selection of the rule violation;

in response to receiving the interaction, configuring playback of the audio information from a position associated with the corresponding portion of the dictation data substantially synchronized with the rule violation.

21. The system of claim 18, wherein the transcription module is communicatively coupled with a workflow management server over a communications network and receives the transcription assignment from the workflow management server.

22. The system of claim 21, wherein the workflow management server is configured to:

receive the dictation data from the author, the author being one of a plurality of authors in communication with the workflow management server over the communications network;

identify the transcription rule set from the rules data store for application to the dictation data;

generate the transcription assignment, such that the transcription assignment comprises the dictation data and the transcription rule set and is formatted for use in the computer-implemented transcription environment;

assign the transcription assignment to the transcriptionist, the transcriptionist being one of a plurality of transcriptionists in communication with the workflow management server over the communications network; and communicate the transcription assignment over the communications network to the transcriptionist for use in the computer-implemented transcription environment.

23. The system of claim 18, wherein the transcription module is configured to provide the computer-implemented transcription environment such that receiving transcription data at the computer-implemented transcription environment from the transcriptionist comprises:

playing the audio information comprised by the dictation data from the computer-implemented transcription environment to the transcriptionist; and receiving the transcription data during playback of the audio information, such that at least some of the textual representations are received via the transcription interface substantially as the respective corresponding portions of the dictation data are being played to the transcriptionist.

24. The system of claim 18, wherein the transcription module is configured to provide a transcription template configured to receive the transcription data from the transcriptionist via the transcription interface, the transcription template being generated at least according to the set of transcription rules.

25. The system of claim 18, wherein the validation module is configured to apply the transcription rule set to the transcription data substantially while the transcription module receives the transcription data from the transcriptionist, such that validating the draft transcription product occurs substantially in real time while receiving the transcription data.

26. The system of claim 18, wherein the validation module is configured to receive an instruction to validate the transcription data, wherein validating the draft transcription product occurs substantially in response to receiving the instruction.

27. The system of claim 18, further comprising: a delivery module, communicatively coupled with the validation module, and configured to output a final transcription product according to the validated transcription product and according to a formatting scheme associated with the context designation.

28. The system of claim 27, wherein the delivery module is configured to:

determine whether the draft transcription product has been validated to generate the validated transcription product; and when the draft transcription product has not been validated to generate the validated transcription product, prevent output of the final transcription product.

29. The system of claim 18, further comprising:

a logging module, communicatively coupled with the validation module, and configured to generate a log substantially upon completion of validating the draft transcription product, the log characterizing performance of at least one of the transcription environment or the transcriptionist.

30. A non-transitory machine-readable medium for rules handling in a transcription environment, the non-transitory machine-readable medium having instructions stored thereon which, when executed by a machine, cause the machine to perform steps comprising:

receiving a transcription assignment at a computer-implemented transcription environment, the transcription assignment comprising:

dictation data comprising audio information dictated by an author into a dictation interface, the author being associated with a context designation; and a transcription rule set being one of a plurality of transcription rule sets stored in a rules data store and generated for application to the dictation data as a function of the context designation, the context designation including at least one context tag indicating a context for the transcription assignment, wherein the at least one context tag is associated with at least one of a plurality of transcription rules, and wherein the context designation is associated with a prompt provided to the author substantially when the author dictated the dictation data, and wherein the transcription rule set includes at least one of a warning rule or an error rule, the warning rule including a trigger based on a condition indicating a possible error, the error rule including a trigger based on a condition indicating a definite error;

receiving transcription data at the computer-implemented transcription environment from a transcriptionist via a transcription interface, the transcription data comprising textual representations of corresponding portions of the dictation data, the textual representations being at least partially synchronized with the corresponding portions of the dictation data; and identifying a rule violation by applying the transcription rule set to the transcription data after receiving the transcription data using the computer-implemented transcription environment, the rule violation being associated with a textual representation and substantially synchronized with the corresponding portion of the dictation data, the application of the transcription rule set triggering at least one of the warning rule or the error rule.

31. The non-transitory machine-readable medium of claim 30, the instructions stored thereon, when executed by a machine, causing the machine to perform steps further comprising:

displaying an indication of the rule violation to the transcriptionist via the computer-implemented transcription environment;

receiving an interaction with the computer-implemented transcription environment from the transcriptionist indicating a selection of the rule violation; and in response to receiving the interaction, configuring playback of the audio information from a position associated with the corresponding portion of the dictation data substantially synchronized with the rule violation.

32. The non-transitory machine-readable medium of claim 30, wherein the context designation comprises context tags that indicate the context for the transcription assignment, each context tag being associated with the plurality of transcription rules, and wherein the transcription rule set is derived from the plurality of transcription rules.

33. The non-transitory machine-readable medium of claim 30, the instructions stored thereon, when executed by a machine, causing the machine to perform steps further comprising:

providing a transcription template to the transcriptionist configured to receive the transcription data from the transcriptionist via the transcription interface, the transcription template being generated at least according to the set of transcription rules.

34. The non-transitory machine-readable medium of claim 30, wherein identifying the rule violation by applying the transcription rule set to the transcription data using the computer-implemented transcription environment comprises:

applying the transcription rule set to the transcription data substantially while receiving the transcription data from the transcriptionist via the transcription interface, such that identifying the rule violation occurs substantially in real time while receiving the transcription data.

35. The non-transitory machine-readable medium of claim 30, the instructions stored thereon, when executed by a machine, causing the machine to perform steps further comprising:

receiving an instruction to validate the transcription data, wherein identifying the rule violation occurs substantially in response to receiving the instruction.

36. The non-transitory machine-readable medium of claim 30, the instructions stored thereon, when executed by a machine, causing the machine to perform steps further comprising:

receiving a submission instruction from the transcriptionist at the computer-implemented transcription environment that a transcription product comprising the transcription data received from the transcriptionist is complete; and validating the transcription product automatically in response to receiving the submission instruction, validating the transcription product comprising identifying the rule violation.

37. The non-transitory machine-readable medium of claim 36, the instructions stored thereon, when executed by a machine, causing the machine to perform steps further comprising:

when validating the transcription product comprises identifying triggering of an error rule indicating a definite error in the transcription data, preventing submission of the transcription product while the rule violation persists.

* * * * *